(12) United States Patent
Huddleston et al.

(10) Patent No.: US 7,533,006 B2
(45) Date of Patent: May 12, 2009

(54) METHOD AND APPARATUS FOR DISCOVERING EVOLUTIONARY CHANGES WITHIN A SYSTEM

(75) Inventors: David Eugene Huddleston, Lakewood, OH (US); Yoh-Han Pao, Cleveland Heights, OH (US); Ronald Cass, Cleveland Heights, OH (US); Qian Yang, Broadview Heights, OH (US); Ella Polyak, Mayfield Heights, OH (US); Peter Cryer, Mississauga (CA); Charles Edward Garofalo, Brighton, MA (US)

(73) Assignee: Computer Associates Think, Inc., Islandia, NY (US)

( * ) Notice: Subject to any disclaimer, the term of this patent is extended or adjusted under 35 U.S.C. 154(b) by 712 days.

(21) Appl. No.: 10/762,090

(22) Filed: Jan. 20, 2004

(65) Prior Publication Data

US 2004/0215430 A1     Oct. 28, 2004

Related U.S. Application Data

(63) Continuation of application No. 10/412,993, filed on Apr. 14, 2003.

(60) Provisional application No. 60/373,780, filed on Apr. 19, 2002, provisional application No. 60/373,977, filed on Apr. 19, 2002, provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/374,064, filed on Apr. 19, 2002.

(30) Foreign Application Priority Data

Jul. 18, 2002   (WO) .................... PCT/US02/22977

(51) Int. Cl.
G06F 17/10 (2006.01)
G06E 3/00 (2006.01)

(52) U.S. Cl. .................... 703/2; 706/16; 706/25; 706/44

(58) Field of Classification Search .................... 703/2, 703/22; 706/12, 13, 16, 25, 44; 702/19
See application file for complete search history.

(56) References Cited

U.S. PATENT DOCUMENTS 4,193,115 A    3/1980  Albus .................... 364/300

(Continued)

OTHER PUBLICATIONS

Riloff et al., E. Classifying Texts Using Relevancy Signatures, Proceddings of the Workshop on Speech and Natural Language, Feb. 1992, pp. 224-229.*

(Continued)

*Primary Examiner*—Russell Frejd
(74) *Attorney, Agent, or Firm*—Baker Botts L.L.P.

(57) ABSTRACT

An adaptive system modeling method is provided. A system model is generated by using data corresponding to an input features set selected by using a baseline significance signature of the system. A superset of the input features and other features also is selected by using the baseline significance signature. Data collected from the system corresponding to the superset is maintained online. A new significance signature of the system is periodically or intermittently determined by performing a discriminant analysis using the online superset data, and is used to detect an evolutionary change in the system.

12 Claims, 33 Drawing Sheets

U.S. PATENT DOCUMENTS

| | | | |
|---|---|---|---|
| 4,215,396 A | 7/1980 | Henry et al. | 364/101 |
| 4,438,497 A | 3/1984 | Willis et al. | 364/431.04 |
| 4,649,515 A | 3/1987 | Thompson et al. | 364/900 |
| 4,663,703 A | 5/1987 | Axelby et al. | 364/148 |
| 4,670,848 A | 6/1987 | Schramm | 364/513 |
| 4,740,886 A | 4/1988 | Tanifuji et al. | 364/150 |
| 4,754,410 A | 6/1988 | Leech et al. | 364/513 |
| 4,858,147 A | 8/1989 | Conwell | 364/513 |
| 4,928,484 A | 5/1990 | Peczkowski | 60/240 |
| 4,972,363 A | 11/1990 | Nguyen et al. | 364/807 |
| 4,979,126 A | 12/1990 | Pao et al. | 364/513 |
| 4,994,982 A | 2/1991 | Duranton et al. | 364/513 |
| 5,023,045 A | 6/1991 | Watanabe et al. | 376/215 |
| 5,033,006 A | 7/1991 | Ishizuka et al. | 364/513 |
| 5,033,087 A | 7/1991 | Bahl et al. | 381/43 |
| 5,052,043 A | 9/1991 | Gaborski | 382/14 |
| 5,111,531 A | 5/1992 | Grayson et al. | 395/23 |
| 5,113,483 A | 5/1992 | Keeler et al. | 395/23 |
| 5,119,648 A | 6/1992 | Bertucci et al. | 69/9.5 |
| 5,140,523 A | 8/1992 | Frankel et al. | 364/420 |
| 5,142,612 A | 8/1992 | Skeirik | 395/11 |
| 5,142,665 A | 8/1992 | Bigus | 395/21 |
| 5,163,111 A | 11/1992 | Baji et al. | 395/22 |
| 5,175,678 A | 12/1992 | Frerichs et al. | 364/148 |
| 5,175,797 A | 12/1992 | Funabashi et al. | 395/22 |
| 5,247,445 A | 9/1993 | Miyano et al. | 364/431.12 |
| 5,311,421 A | 5/1994 | Nomura et al. | 364/157 |
| 5,335,291 A | 8/1994 | Kramer et al. | 382/14 |
| 5,349,541 A | 9/1994 | Alexandro, Jr. et al. | 364/578 |
| 5,420,937 A | 5/1995 | Davis | 382/125 |
| 5,442,778 A | 8/1995 | Pedersen et al. | 395/600 |
| 5,483,650 A | 1/1996 | Pedersen et al. | 395/600 |
| 5,485,390 A | 1/1996 | LeClair et al. | 364/474.24 |
| 5,682,465 A | 10/1997 | Kil et al. | 395/23 |
| 5,734,796 A | 3/1998 | Pao | 395/22 |
| 5,761,389 A | 6/1998 | Maeda et al. | 395/75 |
| 5,790,121 A | 8/1998 | Sklar et al. | 345/356 |
| 5,822,741 A | 10/1998 | Fischthal | 706/16 |
| 5,835,901 A | 11/1998 | Duvoisin, III et al. | 706/19 |
| 5,848,373 A | 12/1998 | DeLorme et al. | 701/200 |
| 5,848,402 A | 12/1998 | Pao et al. | 706/13 |
| 5,895,474 A | 4/1999 | Maarek et al. | 707/514 |
| 5,983,224 A | 11/1999 | Singh et al. | 707/6 |
| 5,999,927 A | 12/1999 | Tukey et al. | 707/5 |
| 6,003,029 A | 12/1999 | Agrawal et al. | 707/7 |
| 6,025,843 A | 2/2000 | Sklar | 345/356 |
| 6,032,139 A * | 2/2000 | Yamaguchi et al. | 706/13 |
| 6,064,996 A * | 5/2000 | Yamaguchi et al. | 706/13 |
| 6,122,628 A | 9/2000 | Castelli et al. | 707/5 |
| 6,128,609 A | 10/2000 | Rose | 706/25 |
| 6,134,541 A | 10/2000 | Castelli et al. | 707/2 |
| 6,137,537 A | 10/2000 | Tsuji et al. | 706/16 |
| 6,236,942 B1 | 5/2001 | Bush | 702/14 |
| 6,269,351 B1 | 7/2001 | Black | 706/12 |
| 6,278,986 B1 * | 8/2001 | Kamihira et al. | 706/25 |
| 6,289,354 B1 | 9/2001 | Aggarwal et al. | 707/104 |
| 6,327,550 B1 | 12/2001 | Vinberg et al. | 702/186 |
| 6,496,812 B1 | 12/2002 | Campaigne et al. | 706/16 |
| 6,496,832 B2 | 12/2002 | Chi et al. | 707/102 |
| 6,523,026 B1 | 2/2003 | Gillis | 707/3 |
| 6,629,097 B1 | 9/2003 | Keith | 707/5 |
| 6,691,045 B1 | 2/2004 | Labute | 702/27 |
| 6,697,791 B2 | 2/2004 | Hellerstein et al. | 706/47 |
| 6,759,010 B2 | 7/2004 | Lewis et al. | 422/82.02 |
| 6,950,786 B1 | 9/2005 | Sonneland et al. | 703/2 |
| 7,103,874 B2 | 9/2006 | McCollum et al. | 717/121 |
| 2003/0200075 A1 | 10/2003 | Meng et al. | 703/22 |
| 2003/0200189 A1 | 10/2003 | Meng et al. | 706/26 |
| 2003/0200191 A1 | 10/2003 | Pao et al. | 706/47 |
| 2004/0019574 A1 | 1/2004 | Meng et al. | 706/15 |
| 2004/0133355 A1* | 7/2004 | Schneider | 702/19 |
| 2004/0215430 A1 | 10/2004 | Huddleston et al. | 703/2 |
| 2004/0220900 A1 | 11/2004 | Yang et al. | 707/2 |

OTHER PUBLICATIONS

Harmer et al., P. An Artificial Immune System Architecture for Computer Security Applications, IEEE Transactions on Evolutionary Computation, vol. 6, No. 3, Jun. 2002, pp. 252-280.*

Guttman, R-Trees A Dynamic Index Structure for Spatial Searching (11 pgs.), 1984.

Riloff et al., E. Classifying Texts Using Relevancy Signatures, Proceedings of the Workshop on Speech and Natural Language, Feb. 1992, pp. 224-229.

Hamer et al., P. An Artificial Immune System Architecture for Computer Security Applications, IEEE Transactions on Evolutionary Computation, vol. 6, No. 3, Jun. 2002, pp. 252-280.

Neugents Are On The Loose, The E-Business Adviser, Apr./May 2000, at 1.

Raisinghani, et al., An Automated Executive and Managerial Performance Monitoring, Measurement and Reporting System, Journal of Electronic Commerce Research, vol. 2, No. 1, 2001, pp. 23-31.

Computer Associates, Office of the CTO, White Paper: Comprehensive eBusiness Intelligence, Nov. 26, 2001, pp. 1-10.

"Pythia—The Neural Network Designer", Runtime Software, 2000.

Javier Herrero et al., A Hierarchical Unsupervised Growing Neural Network for Clustering Gene Expression Paterns, Bioinformatics, vol. 17, No. 2, 2001, pp. 126-136.

Hassoun, Fundamentals of Artificial Neural Networks, 1995, MIT Press, (6 pg).

Fahlman et al., "The Cascade-Correlation Learning Architecture", 1990, School of Comptuer Science.

Hassoun, "Fundamentals of Artificial Neural Networks", 1995, pp. 103-106 (3 pg).

Hai-Lung Hung et al., "Dynamic Hierarchical Self-Organizing Neural Networks", 1994, 0-7803-1901-X/94 IEEE.

Henrique et al., "Model Structure Determination in Neural Network Models", 2000, Elsevier Science Ltd.

Wlodzislaw Duch et al., "Survey of Neural Transfer Functions", 1999, Neural Computing Surveys 2, 163,-212.

William H. Hsu and William M. Pottenger and Michael Weige and Jie. Wu and Ting-Hao Yang, Genetic Algorithms for Selection and Partitioning of Attributes in large-scale Data Mining Problems, Data Mining with Evolutionary Algorithms: Research Directions, pp. 1-6, AAAI Press, Jul. 18, 1999.

Ersoy, O.K. et al., "Parallel, Self-Organizing, Hierarchical Neural Networks" IEEE Transactions on Neural Networks, IEEE Inc., New York, US, vol. 1, No. 2, Jun. 1990, pp. 167-178, XP 000133516, ISSN: 1045-9227.

Mandayam et al., "Application of Wavelet Basis Function Neural Networks to NDE*", 1997.

Orr, "Introduction to Radial Basis Function Networks", Centre for Cognitive Science, 1996.

IBM, "IBM Techical Disclosure Bulletin, Sep. 1985, US", vol. 28, No. 4, "Clustering Deterministic Acoustic Spectral Prototypes with an Adaptive Quadratic Form Using Trace Constraint" (NN85091703) (3 pgs).

Relambondrainy, "A Conceptual Version of the K-means Algorithm", 1995.

Hassoun, "Fundamentals of Artificial Neural Networks", 1995 (5 pgs).

Bouchard, "New Recursive-least-Squares Algorithms for Nonlinear Active Control of Sound and Vibration Using Neural Networks", 2001.

Patra et al. (Patra), "Functional Link Artificial Neural Network-Based Adaptive Channel QualizationofNonlinear Channels with QAM Signal", 1995.

Surajit Chaudhuri, Usama Fayyad and Jeff Bernhardt, "Scalable Classification over SQL Databases", *Proceedings of the 15th International Conference on Data Engineering*, Mar. 23-26 1999, Sidney, Australia, pp. 470-479, 1999.

Dennis T. Lee, Yoh-Han Pao and Dejan J. Sobajic "Dynamic System Control Using Neural Networks", pp. 25-30, 1991.

Yoh-Han Pao "Neural Net Computing For Patter Recognition" *Handbook of Pattern Recognition and Computer Vision*, pp. 125-162 (edited by C.H. Chen, L.F. Pau and P.SP. Wang), 1989.

Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", *1987 IEEE*, pp. 390-395.

Bernard Widrow and Rodney Winter (Mar. 1988) "Neural Nets for Adaptive Filtering and Adaptive Pattern Recognition", *IEEE Computer*, pp. 25-39.

Bernard Widrow, Rodney G. Winter, and Robert A. Baxter (Jul. 1988) "Layered Neural Nets for Pattern Recognition", *IEEE Trans. Acoustics, Speech, and Signal Processing*, vol. 36, No. 7, pp. 1109-1118.

Yoh-Han Pao, (1989) *Adaptive Pattern Recognition and Neural Networks* (160 pgs).

Andrew G. Barto (1990) "Connectionist Learning for Control",*Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artificial Intelligence in Engineering*, 5(1):9-22.

Kumpati S. Narendra and Kannan Parthasarathy (Mar. 1990) "Identification and Control of Dynamical Systems Using Neural Networks," *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Esther Levin, Naftali Tishby, and Sara A. Solla (Oct. 1990) "A Statistical Approach to Learning and Generalization in Layered Neural Networks", *Proc. IEEE*, vol. 78, No. 10, pp. 1568-1574.

Les Atlas, Jerome Comnor and Mark Damborg (1991) "Comparisons of Conventional Techniques and Neural Network in Computer-aided Design", *Artificial Intelligence in Engineering*, 5(1):9-22.

Miodrag Djukanov, Borivoje Babic, Dijan J. Sobajic and Yoh-Han Pao (1991) "Unsupervised/Supervised Learning Concept for 24-Hour Load Forecasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J.F. Dow (1991) "Creating Artificial Neural Networks That Generalize", *Neural Networks*, vol. 4, pp. 67-79.

Petros A. Ioannou and Anirudda Datta (Dec. 1991) "Robust Adaptive Control: A Unified Approach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchius, Judy Franklin and Chuck Anderson (1992) "Nadaline Connectionist Learning vs. Linear Regression at a Lamp Manufacturing Plant", *Proceedings of The First IEEE Conference on Control Applications*, pp. 552-558.

William Finnoff, Ferdinand Hergert, and Hans Georg Zimmerman (1993) "Improving Model Selection by Noconvergent Methods", *Neural Networks*, vol. 6, pp. 771-783.

Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.

Michale Nikolaou (1993) "Neural Networks Modeling of Nonlinear Dynamical Systems", *Proceedings of the 1993 American Control Conference*, pp. 1460-1464.

Stevan V. Odri, Dusan P. Petrovacki, and Gorana A. Krstonosic (1993) "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceeding of the Thirty-Seventh Power Instrumentation Symposium*, pp. 1-15.

Timothy J. Gracttinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Process Monitoring and Optimization for Power Systems Applications", *IEEE International Conference on Neural Networks*, pp. 3697-3702.

Percy P.C. Yip and Yoh-Han Pao (1994) "A Guided Evolutionary Computation Technique as Function Optimizer", *Proceeding of First IEEE Conference on Evolutionary Computation*, pp. 628-633.

Stuart J. Russell and Peter Norvig, (1995) "Learning From Observations", *Artificial Intelligence: A Modern Apprach*, pp. 525-562.

Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transactions on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5):521-253.

Yoh-Han Pao and Zhou Meng (1996) "A Perspective on Funtional-Link Computing, Dimension Reduction and Signal/Image Understanding", *Proceedings of 1996 IEEE Signal Processing Society Workshop*, pp. 213-222.

Michael J.A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997) "A New Criterion in Selection and Discretization of Attributes for the Generation of Decision Trees", *IEEE Transactions on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M.Fayyad and Cory A. Reina, (Jun. 1998) "Scaling Clustering Algorithms to Large Databases", *Proc. 4th Int'l Conf. Knowledge Discovery & Data Mining*, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J.A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Datathrough Equalized Orthogonal Mapping", *IEEE Transaction on Neural Networks*, pp. 11(4):1031-1038.

PCT Notification of Transmittal of International Search Report or the Declaration, PCT/US 03/11713, Reference 0655/67092; mailed Nov. 8, 2004, Int'l filing date Apr. 15, 2003, and PCT International Search Report (7 pgs).

PCT Notification of Transmittal of International Search Report or the Declaration, PCT/US 03/11829, Reference 0655/65206; mailed Aug. 31, 2004, Int'l filing date Apr. 17, 2003, and PCT International Search Report (7 pgs).

Rassokhin et al., "Nonlinear Mapping of Massive Data Sets by Fuzzy Clustering and Neural Networks", (14 pgs.), 2000.

*United States Patent Office, Office Action* Summary for U.S. Appl. No. 10/418,659, filed Apr. 18, 2003, in the name of Zhuo Meng, (40 pgs.), Notification Date Jul. 18, 2008.

* cited by examiner

FIG. 7

- N0:thin-59,thick-25; ; Categorization by thickness
  - N1: thin-9,thick-20; stiffens=low
    - N4: thin-5,thick-1; viscosity=low
    - N5: thin-2,thick-9; viscosity=med
    - N6: thin-1,thick-10; viscosity=high
  - N2: thin-21,thick-1; stiffens=med
    - N7: thin-10,thick-0; viscosity=low
    - N8: thin-7,thick-1; viscosity=med
    - N9: thin-4,thick-0; viscosity=high
  - N3: thin-29,thick-4; stiffens=high
    - N10: thin-10,thick-0; viscosity=low
    - N11: thin-11,thick-0; viscosity=med
    - N12: thin-8,thick-4; viscosity=high Wine Example

Problem Codes influencing SLAs

Last Week

| 1 | Network |
| --- | --- |
| 2 | PC |
| 3 | Mainframe |
| 4 | Password |
| 5 | Word Processing |
| 6 | Spreadsheet |
| 7 | Dial-up |
| 8 | Hardware |
| 9 | Email |
| 10 | Software Upgrade |

This Week

| 1 | PC |
| --- | --- |
| 2 | Network |
| 3 | Printer |
| 4 | Software Upgrade |
| 5 | Password |
| 6 | Dial-up |
| 7 | Spreadsheet |
| 8 | Hardware |
| 9 | Email |
| 10 | Word Processing |

METHOD AND APPARATUS FOR DISCOVERING EVOLUTIONARY CHANGES WITHIN A SYSTEM

This is a continuation of application Ser. No. 10/412,993 filed Apr. 14, 2003 which claims priority from PCT International Application No. PCT/US02/22977 filed Jul. 18, 2002 and claims the benefit of Provisional application Nos. 60/373,780, 60/373,977, 60/374,020, 60/374,024, 60/374,041 and 60/374,064 filed in the United States on Apr. 19, 2002.

CROSS-REFERENCE TO RELATED APPLICATION

This application claims priority from PCT International Application No. PCT/US02/22977, filed Jul. 18, 2002 and entitled "METHOD AND APPARATUS FOR DISCOVERING EVOLUTIONARY CHANGES WITHIN A SYSTEM", and claims the benefit of the following co-pending provisional applications:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

TECHNICAL FIELD

This application relates to numerical modeling. In particular, the application relates to adaptive system modeling and model evaluation.

DESCRIPTION OF RELATED ART

Numerical modeling typically involves generating a computer program or software module which can approximate or model the behavior of a dynamic system. A system may be characterized through a system model as a group of input parameters and corresponding group of output values which may be predicted by applying the input parameters. A purpose of the system model is to enable predictions or forecasts of the underlying dynamic system.

Much of numerical modeling may fall under the umbrella of machine learning. Machine learning involves characterizing the behavior of a physical or procedural system, usually by utilizing a software simulation. The purpose is to enable prediction or forecasting of the system's behavior. For example, a profit may be made or a loss avoided, through a good forecast of a stock price. similarly, with other systems, some sort of risk may be avoided or benefit gained, through some foreknowledge. This is not fortune-telling, but rather a forecast based on a system's past behavior and possibly based on its past reactions to outside influences. There is some error inherent in these predictions, and the goal is to minimize this error.

Machine learning is also sometimes called "blackbox modeling" because a system is usually reduced to a set of inputs and outputs, and little or no consideration is afforded to the inner workings of the system.

Machine learning is different from other types of numerical modeling, such as first principle modeling, which relies on determining the inner mechanisms of a system. For complex and interesting systems first principle modeling is very difficult, probably expensive, and perhaps impossible.

In the exemplary system of FIG. 4, the output is the predicted price at which a stock will close. The inputs to the system are market factors, such as prices and activity of other stocks, and outside factors which influence the market, such as price of oil and retail sales. Even with little experience in the stock market, one may readily see that the possible number of model inputs is potentially enormous. Unless the focus is on the most significant indicators of a stock's price, even a supercomputer might not accomplish the task of modeling this system.

A typical numerical modeling process includes a selection of system features to treat as model inputs. Except for the simplest systems, the set of possible input features are typically reduced to a manageable set of inputs. At the least, feature reduction strives to remove features which have the least effect on the system output and to remove features which appear to be static. Usually, an attempt is made to select out features with less effect on the outputs, in order to reduce the need for computational resources, as well as to reduce processing times, because manageability of the model typically depends, upon analysis and processing resources.

A numerical modeling process typically includes (a) a training or learning phase in which a model is generated through training from a body of known data, holding out some percentage of the data for (b) a model validation or test phase in which accuracy of the trained model is tested.

A pairing of system inputs and outputs is often called a "pattern". In order to build a numerical model, a set of patterns, called a training set, is generated. In order to produce an effective model, the training set should contain patterns representative of most (if not all) of a system's behavioral modes. The group of outputs associated with a particular group of input parameters in a particular pattern may be actual outputs collected from the system when the group of inputs were applied to the system. Alternatively, the outputs in the pattern may be a group of desired outputs, when the group of inputs is applied to the system.

In the learning phase, a learning methodology, which typically is embodied in a computer program or software module, is applied with patterns in the training set, and the numerical model thereby learns the system behavior which is then stored as model parameters. Numerous learning methodologies are conventionally known. The methodologies of the present invention are not limited to application of any particular ones of the conventional learning methodologies.

The trained system model is typically tested or validated in a test phase against another set of patterns, called a "test set". The test set should not contain patterns which were present in the training set, The test phase involves, for each pattern in the test set, comparing the system output predicted by the model to the expected outputs in the test pattern. The accuracy or effectiveness of the model is gauged by-how well the model predictions agree with the pattern outputs.

If the accuracy of the trained model is deemed sufficient, the model is deployed to the field and used to predict system behavior. After the model is deployed, the accuracy of the model may be periodically re-evaluated, in order to detect if the model is losing its effectiveness. If the model performance has degraded, the model may be re-trained with additional data. However, if data has not been collected continuously while the model is in operation, a large effort might be necessary to gather new data and/or to search for inputs which have now become significant. This cycle has the additional disadvantage that a model's degradation beyond usefulness may be discovered late in the cycle, and, once discovered, the analysis and deployment steps must be repeated.

In some instances, new data corresponding to system inputs and system outputs may be collected and accumulated on-line while the model is in operation, and may be available for use in re-training the model. However, if re-training fails to increase accuracy of the model to acceptable levels, then the feature selection performed in the original analysis must be repeated to determine if the system has evolved such that input features previously thought to be discardable have now become significant and the whole process of training and deployment also must be repeated.

SUMMARY

An adaptive system modeling method is provided. In one embodiment, the method includes selecting from a plurality of candidate features of a system a set of input features and a superset of the input features and other features by using a baseline significance signature, generating a system model by using data corresponding to the selected input features set, maintaining online data corresponding to the superset of the input features and other features collected from the system, determining a new significance signature of the system by using the online superset data to perform a discriminant analysis of the candidate features, and detecting an evolutionary change in the system by comparing the new significance signature and the baseline significance signature. The method may further comprise selecting new input features by using the new significance signature.

The method, according to another embodiment, includes determining a baseline significance signature of current behavior of a system by performing a discriminant analysis, selecting from a plurality of candidate features a set of input features and a superset of the input features and other features by using the baseline significance signature, generating a system model by using data corresponding to the selected input features set, and maintaining online data corresponding, to the superset of the input features and other features collected from the system. The method may further comprise evaluating an accuracy of predictions by the system model based on additional input features data, determining a new significance signature of the system by performing another discriminant analysis of the candidate features, if the accuracy of the system model predictions is below a predetermined accuracy level, and selecting new input features by using the new significance signature. The additional input features data may be obtained from the online collection of data.

According to another embodiment, the adaptive system modeling method includes determining a baseline significance signature of current behavior of a system by using a decision tree methodology to perform a discriminant analysis, selecting from a plurality of candidate features a set of input features by using the baseline significance signature, and generating a system model by using data corresponding to the selected input features set.

BRIEF DESCRIPTION OF THE DRAWINGS

The features of the present application can be more readily understood from the following detailed description with reference to the accompanying drawings wherein:

FIG. 7 shows a schematic representation of an exemplary decision tree for a coating formulation model;

DETAILED DESCRIPTION

The present disclosure provides tools (in the form of methodologies and systems) for adaptive system modeling and model evaluation. For example, the methodologies of this disclosure may be incorporated in software-implemented systems to model dynamic systems. The methodologies may be embodied in one or more computer programs or software modules stored on a conventional program storage device or computer readable medium, and/or transmitted via a computer network or other transmission medium.

The system modeling and model evaluation methodologies of the present disclosure reduce or eliminate a need to begin a modeling cycle anew, when the system has evolved such that the deployed model has reached the end of its usefulness.

Figure 1:
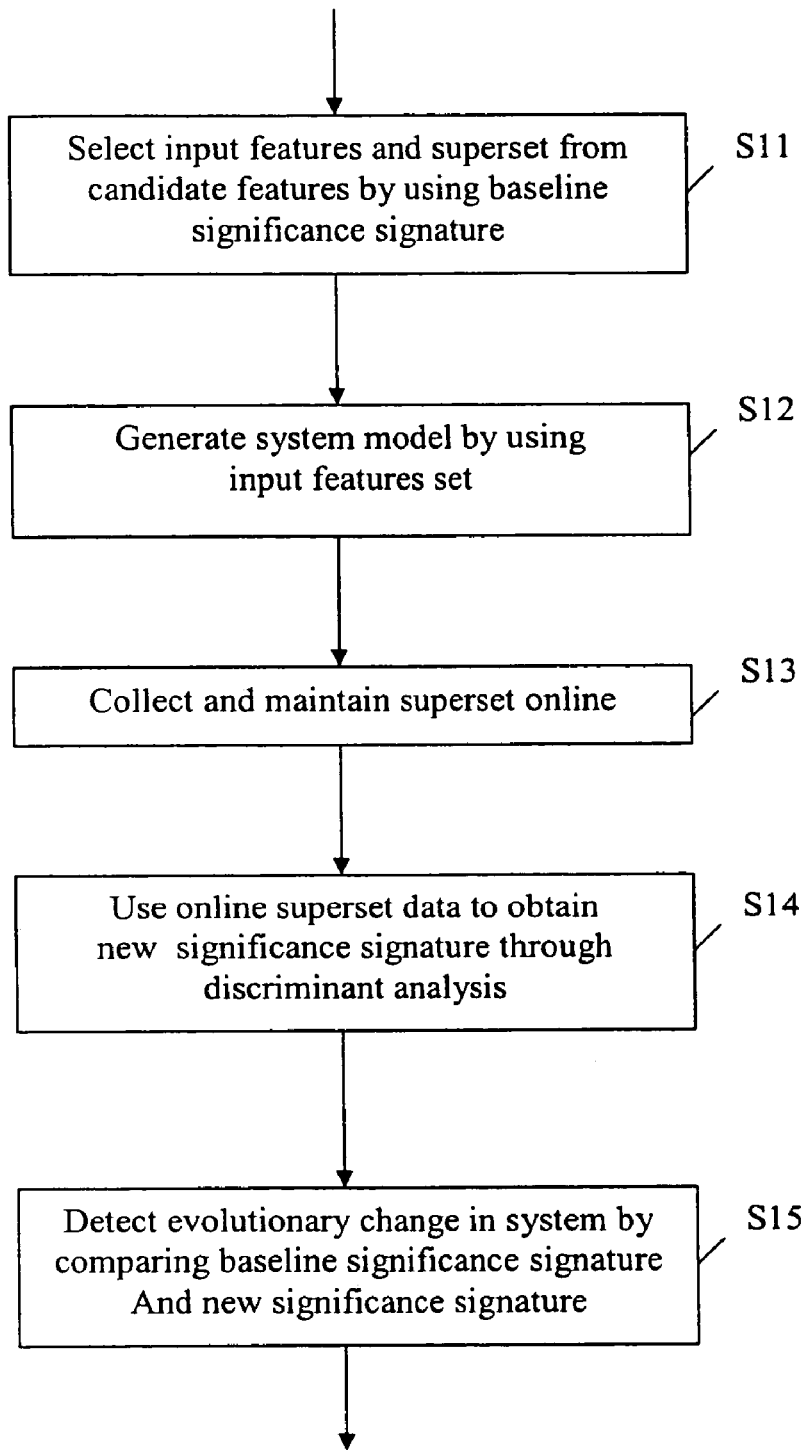
FIG. 1 shows a flow chart of an adaptive system modeling method, in accordance with one embodiment of the present disclosure, which may be applied to detect an evolutionary change in a system.

An adaptive system modeling method which may be applied to detect an evolutionary change in a system, in accordance with an exemplary embodiment shown in FIG. 1, includes selecting from a plurality of candidate features of the system a set of input features and a superset of the input features and other features by using a baseline significance signature (step S11). A system model is generated by using data corresponding to the selected input features set (step S12). Data corresponding to the superset of the input features and other features collected from the system is maintained online (step S13). A new significance signature of the system is determined by using the online superset data to perform a discriminant analysis of the candidate features (step S14). An evolutionary change in the system is detected by comparing the new significance signature and the baseline significance signature (step S15). A new set of input features may be selected by using the new significance signature.

Figure 2:
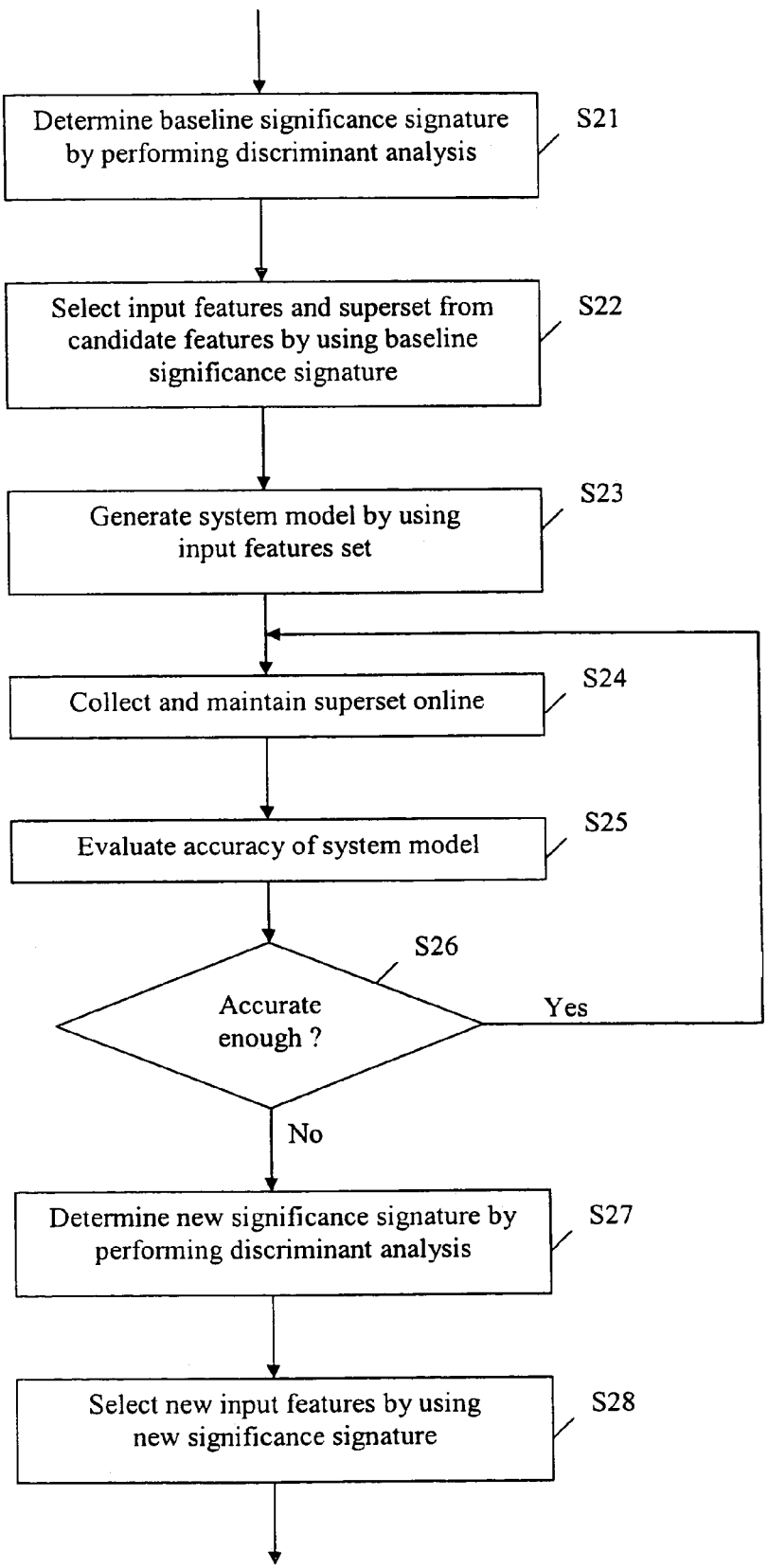
FIG. 2 shows a flow chart of an adaptive system modeling method, in-accordance with another embodiment of the present disclosure.

An adaptive system modeling method according to another exemplary embodiment is described with reference to FIG. 2. A baseline significance signature of current behavior of a system is determined by performing a discriminant analysis (step S21). A set of input features and a superset of the input features and other features are selected from a plurality of candidate features by using the baseline significance signature (step S22). A system model is generated by using data corresponding to the selected input features set (step S23). Data corresponding to the superset of the input features and other features collected from the system is maintained online (step S24). The method optionally may further include evaluating an accuracy of predictions by the system model based on additional input features data (which may be obtained from the online collection of data) [step S25], determining a new significance signature of the system by performing another discriminant analysis of the candidate features (step S27), if the accuracy of the system model predictions is below a predetermined accuracy level (step S26), and selecting new input features by using the new significance signature (step S28).

Figure 3:
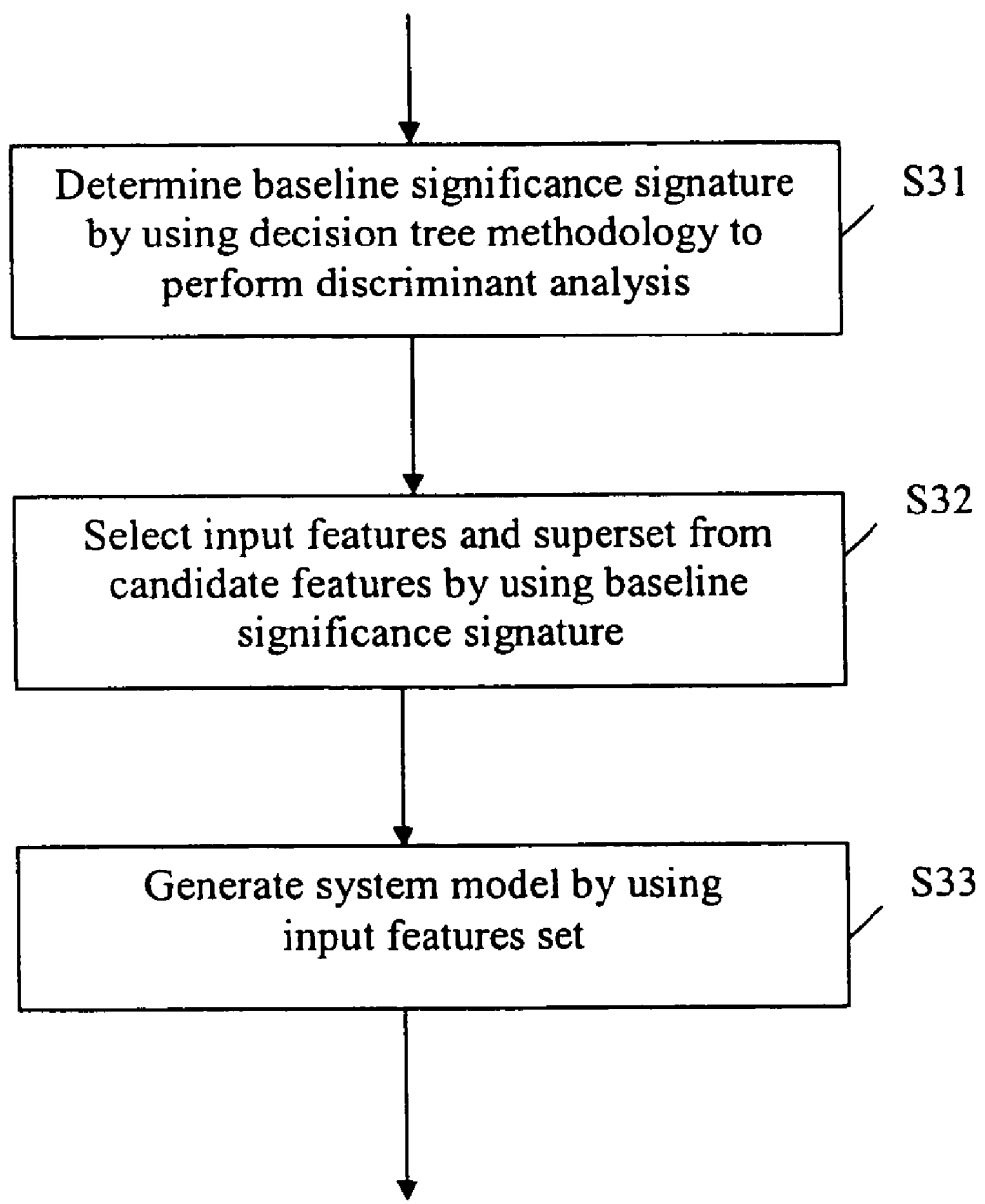
FIG. 3 shows a flow chart of an adaptive system modeling method, according to another embodiment of the present disclosure.

According to another embodiment (FIG. 3), the adaptive system modeling method includes determining a baseline significance signature of current behavior of a system by using a decision tree methodology to perform a discriminant analysis (step S31), selecting from a plurality of candidate features a set of input features by using the baseline significance signature (step S32), and generating a system model by using data corresponding to the selected input features set (step S33).

A. Overview

There are a variety of numerical modeling techniques available to characterize a system. The techniques range from statistical techniques to tools such as neural networks, fuzzy logic, and decision trees. The methodologies of this disclosure may be applied to any of the numerical modeling techniques. If the problem can be framed as identifying significant system inputs from a candidate set of features, then the methodologies of this disclosure may be applied.

A system being modeled may have N available input features. Through standard feature reduction techniques, and perhaps through first principles (e.g., causal theories for all or part of the system), one may select a core group of M features to include in model inputs. In addition, some of the remaining N-M features still may influence the model output, and having P($>$M) input features may improve the model accuracy. However, the system response to the P input features may drift or change over time, as discussed below.

Selection of inputs to use from a set of candidate features and a methodology to process the inputs before presentation to the modeling technique is at least as important as choosing a modeling technique (and perhaps more so).

First cuts at reducing the data may include finding features which are static or strongly correlated with other features. Such features make no contribution to the modeling effort and consume resources. Including these features may also impede the modeling methodology from finding useful patterns in the data.

Figure 4:
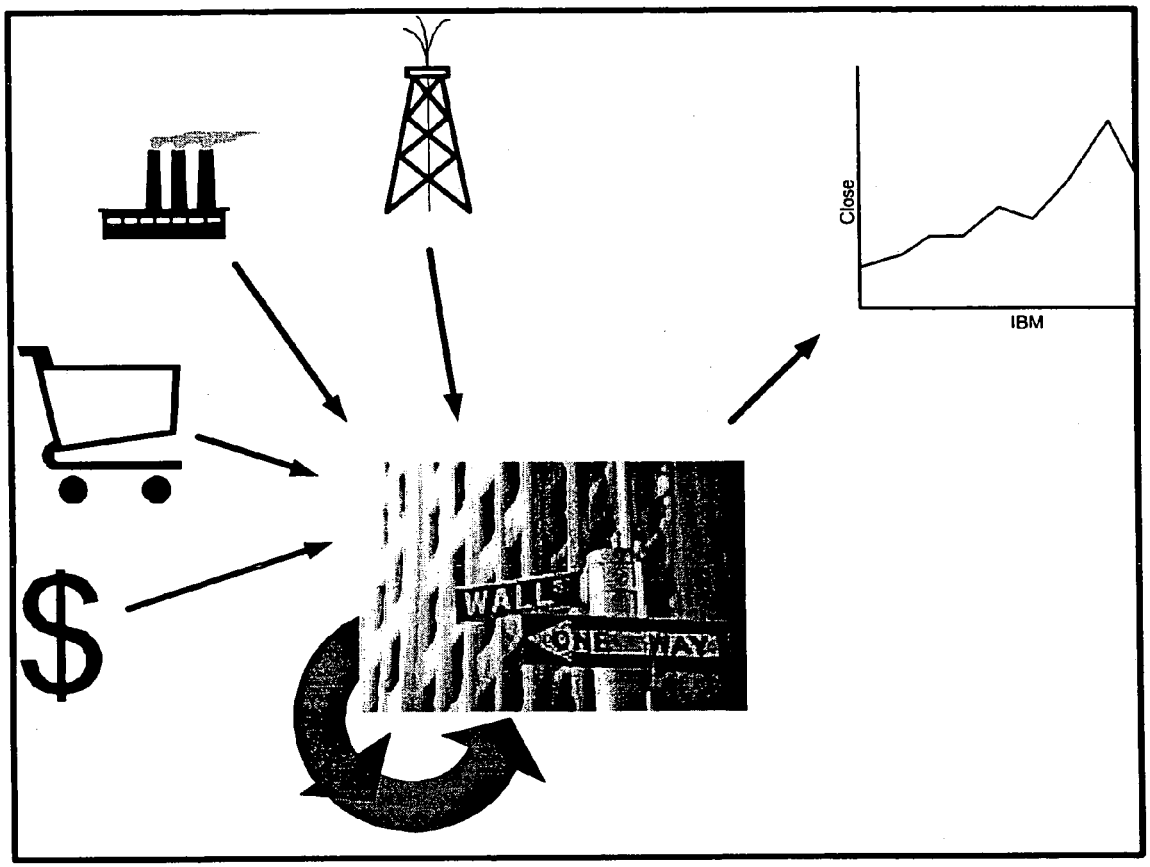
FIG. 4 shows a schematic representation of a stock price forecasting system.
Figure 5:
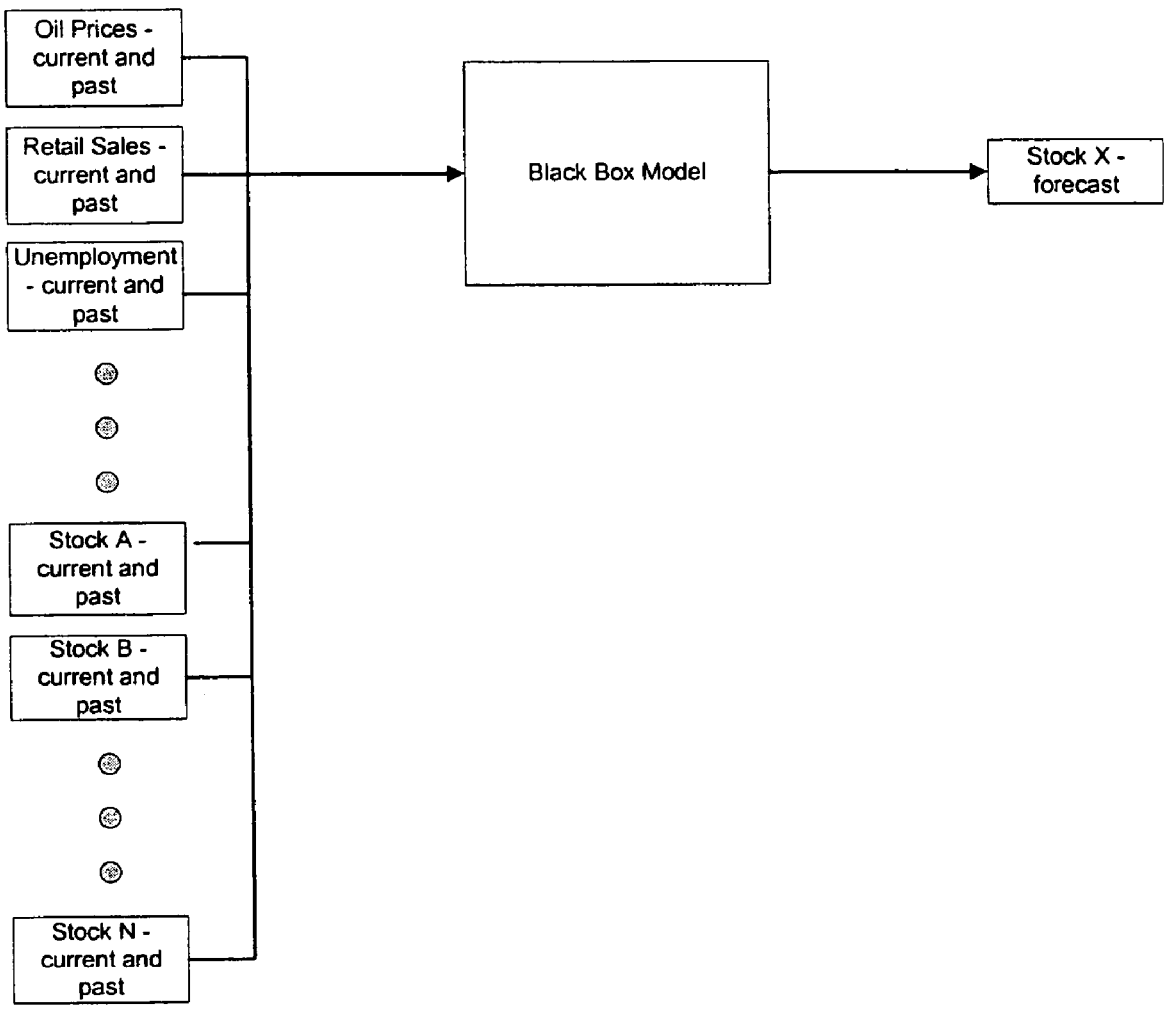
FIG. 5 shows a schematic representation of a blackbox model corresponding to the stock price forecasting system of FIG. 4.

After removing static and correlated features, one selects the features which have the most significance to the output(s) while considering the available computing resources. Usually, one is not confronted with discarding relatively highly significant features, in order to reduce the input set to a workable number of inputs. Instead, one can often identify a large number of features which, at least at the time of analysis, do not seem to have a significant effect on the output(s). The remaining significant features may be used to generate a usable model of the system. For example, the system of FIG. 4 may be reduced to a black box representation, such as shown in FIG. 5.

The methodologies of this disclosure utilize discriminant analysis to characterize the relative significance of the P input features used for modeling. This ranking of features by significance is referred to herein as a "significance signature".

One type of discriminant analysis is provided through methodologies for generating decision trees. A by-product of tree generation is that features in the tree are ranked according to their significance to the system output.

In addition to characterizing the model by relative significance of the P inputs currently included in the model, data for the N-M features are collected and maintained on-line. The group of N-M features is referred to hereinafter as a superset of the P features activated in the model. This strategy may extend to setting M to zero, and selecting P out of N possible features.

Models may be evaluated by consulting with data that was not used in the training process which typically provides an objective measure of how well one might expect the model to predict future data. For the example corresponding to FIG. 4, one may train with data from the immediately preceding year, except for holding out data from the most recent month. Once the model is built, one may consult the model by using the data from the most recent month.

In rapidly evolving systems, such as the stock market, one might expect the model's performance to-degrade over time. The model may be periodically, or even continuously, evaluated to gauge when it is degrading.

As a model degrades, it may at least be retrained on more recent data. In some instances, the input feature set does not need to be changed, since only the interactions between the inputs have changed. However, in some other instances, a sufficiently accurate model is not attainable with the current set of inputs. For example, the system may be strongly influenced by a feature not currently represented in the input set, or perhaps a feature in the input set no longer influences the output significantly and therefore may be removed. In the example of FIG. 4, new outside factors may affect the market, such as an international conflict which perturbs the market's reaction to normal market forces.

The model is periodically (or intermittently) re-evaluated for its effectiveness. In addition to checking for a minimum accuracy against a test set, the N-M candidate feature set is again characterized through discriminant analysis to determine the currently most discriminating features. If there has been a radical change in the significance of possible input features, then appropriate features may readily be re-selected by using the new significance signature and the model is trained against the available on-line data. As in the original analysis, some percentage of the data is withheld for validation of the new model.

In data mining or machine learning applications, data is frequently collected continuously from the system being modeled. Thus, new data may be used for consultation of the model, to obtain predictions or forecasts. Secondarily, this data may be kept online until the predictions are validated, to measure the performance of the model.

To fully utilize the methodologies of this disclosure, a superset of the currently used input features is collected. The periodic significance signatures may be used to determine that other features have become more significant to the system's behavior. As different category codes become more significant, the derived features may be reshuffled accordingly.

As mentioned above, data may be collected on-line for all of the possible inputs, and feature selection may be performed as necessary, ranging over all available features. Best results might be expected by anchoring the model with some fixed core group of inputs (especially under circumstances in which first principle theories for all or part of the system are available) with variation within a limited group of candidate features. The core features may be the foundation of a good model, and the variable set of features enables tuning the model for evolutionary changes or drift in the system behavior.

Figure 6:
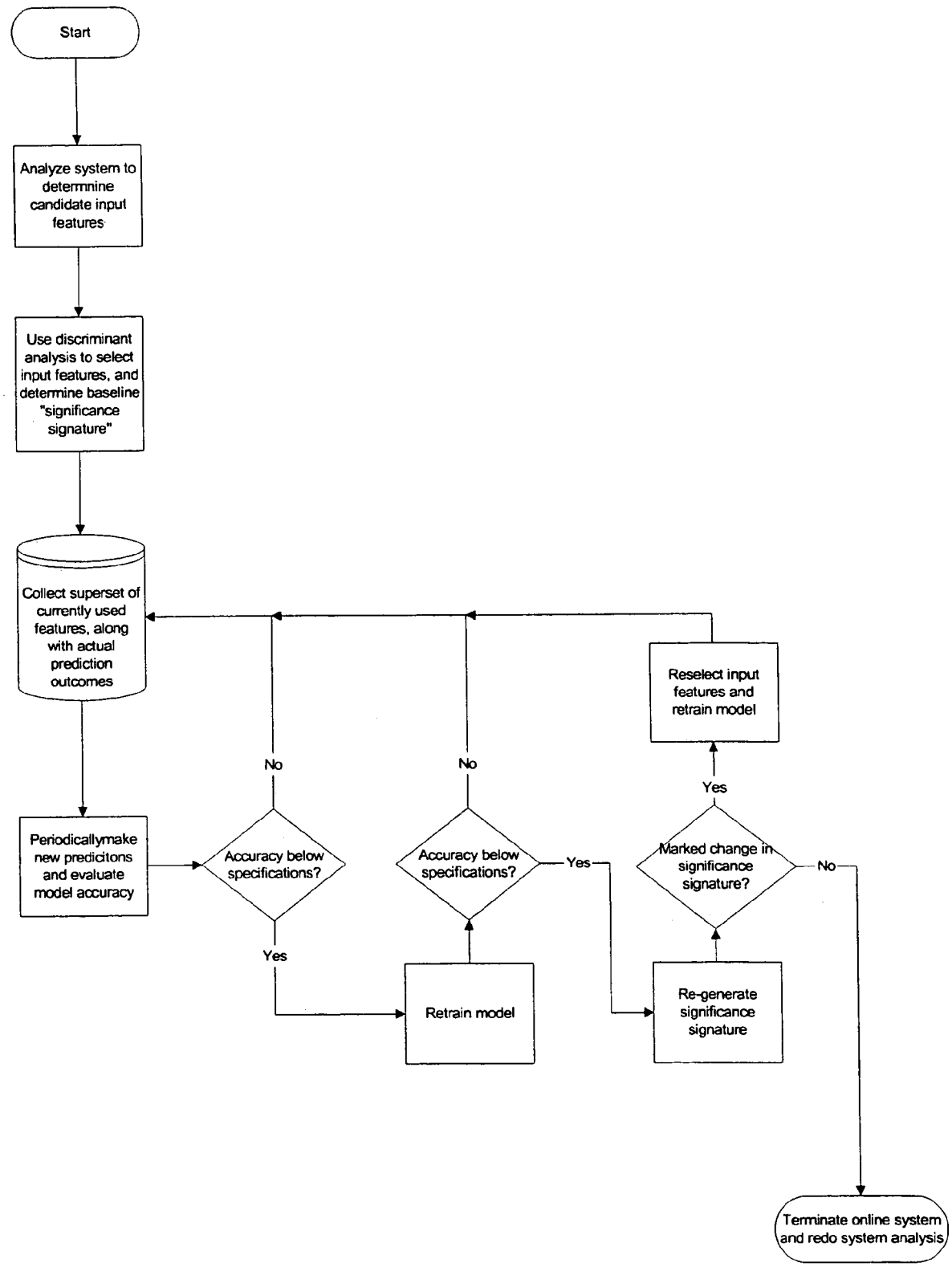
FIG. 6 shows a flow chart of an adaptive system modeling method, according to another embodiment of the present disclosure.

A methodology according to one embodiment of this disclosure is illustrated in FIG. 6. Initially, the system undergoes analysis for selection and determination of data pre-processing requirements. Next, the system is modeled and put on line.

However, unlike the conventional machine learning or data mining procedure, a superset of the features currently used as inputs is maintained online. Periodic predictions are made and model accuracy measured. A model may be retrained with more recent data, if accuracy has degraded.

A baseline significance signature is maintained to characterize current behavior of the system. A superset of candidate input features is maintained online. For the superset, the features currently included in the model are collected along with additional features not currently used for modeling. The superset may extend up to all possible input features for the model. Discriminant analysis is periodically or intermittently performed to obtain significance signatures of the superset of features to enable discovery of changes in the relative influences of the available features. If a significant evolutionary change in the system is detected, new significant features are selected as model inputs. Since the superset is maintained online, data is immediately available for training and deployment of a new model.

Even after reselection of model inputs, the model might perform poorly, which might be expected in instances in which a new feature, not currently being monitored or collected, becomes significant. Frequent occurrences of poor performance may be an indication that the system was not well understood in the initial analysis phase.

Some conventional modeling methodologies include periodic retraining of the model. While a few conventional techniques provide for dynamic adjustment of modeling parameters prior to retraining, such conventional adjustments typically do not involve changing the model inputs. Selecting of model inputs is generally considered part of the analysis phase, and is usually not performed after the model is in operation.

The methodologies of this disclosure provides substantial advantages over simply retraining with new data. Use of the significance signature as a baseline, and as an ongoing measure of system drift, enables proactively adapting the system model. The significance signature obtained through discriminant analysis may be used to determine adjustments to the set of model inputs in order to adapt the model to system drift.

B. Discriminant Analysis

Discriminant analysis is a methodology for identifying features which are most significant to an outcome. A significance signature which provides a measure of significance of each feature results from the discriminant analysis. A change in this signature, and especially a change in the set of significant features, may indicate evolution or drift of the system.

Any of a number of known discriminant analysis techniques may be used in the methodologies of this disclosure to determine a system's significant input features, along with their relative significance ranking. According to one embodiment, statistical correlation may be used as a simplistic discriminant analysis technique. There are also more advanced statistical methodologies for discriminant analysis.

1. Discriminant Analysis and Decision Trees

A discriminant analysis methodology according to another embodiment utilizes a decision tree technique to generate the significance signature. Decision trees identify features which are the most effective in splitting a data set according to a previously performed categorization of the data. As the tree is built, the most significant features (for example, in descending order of importance) are selected through the methodology often according to information theoretical measures or statistical significance tests.

A decision tree often is used as the sole modeling tool for forecasting. However, the decision tree in some instances may not provide complete categorization of a data pattern. In circumstances in which the tree generated does not permit exact classification, a probabilistic classification also might be performed. Regardless of whether the tree permits exact classification, it is useful for determining the significant features of a system.

Certain decision tree methodologies allow for easy integration of symbolic and numeric data. Significance testing of combined symbolic and numeric features might be more difficult with purely statistical methodologies.

Discriminant analysis may include applying a decision tree methodology to a data set which has already been classified in some manner. Decision tree methodologies recursively partition the data set to obtain subgroups that are separated according to their classification. At each level of the tree a test on one or more of the features is used to partition the data. The goal usually is to perform the most effective tests to obtain discriminant detection.

The primary use of decision trees may be classification of unknown data. However, as an additional benefit, the sequences of tests leading to a homogenous partitioning of a subtree may be expressed as a rule (e.g., if f1=0 and f2=1 and f3=2, then out1=x with some probability). Such rules may enable human reviewers and users of a system model to better understand how, and how effectively, the system is being modeled.

FIG. 7 shows an exemplary decision tree for a coating formulation system. Data is categorized according to thickness of the applied coating after curing. The decision tree shows the most significant influences on the coating thickness, in order of their importance.

The exemplary decision tree shown in FIG. 7 is composed of nodes and branches. Node 0 is the root node, nodes 1-3 are branch nodes, nodes 4-12 are leaf nodes. The population being partitioned is already classified. For the data set corresponding to FIG. 7, each pattern was classified according to whether its thickness rating was "low" or "high". The features (e.g., viscosity) were binned as "low", "med", or "high". Associated with each node of the tree are counts of the class subpopulations at that node. For instance, node 0 in the coating data tree contains 25 patterns with a high thickness value, and 59 with a low thickness value. The goal is to have the leaf nodes be homogenous, and thus completely partition the starting population. However, the leaf nodes often have only a preponderance of a single class. Sometimes there is no clear majority, because the tree growth procedure was deliberately stopped or no test exists for the data to further partition the node. In the example shown in FIG. 7 only a probabilistic classification or rule is available for this branch of the tree. Nodes 4, 5, 6, 8, and 12 in FIG. 7 are examples of non-homogenous leaf nodes. From FIG. 7 the following rules may be drawn: (a) surftens and viscosity are the most significant features; (b) formulations with low surftens and medium-to-high viscosity usually form thick coatings; (c) low surftens and low viscosity usually lead to thin coatings; and (d) medium to high surftens usually lead to thin coatings.

The rules may be checked against a domain expert's knowledge or intuition of how these formulation parameters affect the likely thickness of an applied coating. Some of these rules may be unfamiliar to the domain expert, or they may be called into question. These may be verified, and if true represent discovered knowledge about the system.

The tree is grown by choosing a test at each level which suitably partitions the data set. Usually each possible test is tried in turn and the best one chosen according to a diversity function. Individual diversity functions are discussed below. The diversity functions attempt to measure how well the feature test cleaves the data set. Most methodologies choose the same test across the entire level, in which case a selected feature test is used only once. Evaluations of feature tests applied further down in the tree are less reliable because they rely on subpopulations which are progressively less representative of the entire population.

Decision tree methodologies may be roughly broken down into binary and non-binary methodologies. Binary methodologies only allow two branches per node (e.g., 0 or 1, Yes or No, etc.). Non-binary methodologies allow many branches per node, and lead to bushier trees. The non-binary methodologies are perhaps better suited for data which is not fundamentally binary in nature. However, almost any data may be binned into two bins or derived fields created to make the data appear binary. Since non-binary trees tend to be bushier, they quickly arrive at the point at which each split is less reliable as a discriminator. In addition, an effect sometimes found in non-binary trees is that some feature test can fracture the data set into many small, nearly homogenous, nodes. An example might be testing on a person's name, which might produce leaf nodes for every person in the database. Such a test is unlikely to produce a useful rule about the system.

The methodologies use a finite number of labels or ranges for the possible feature values. The methodologies may be used against continuous numeric data by means of discretizing or binning the values. As a first approximation, an arbitrary number of evenly spaced ranges is selected for each numeric feature, and the feature value is labeled by the range, or bin, it falls in. For instance, the total observed range of the feature may be broken into 3 equal intervals, and labeled low, medium, and high. Some researchers recommend further optimizing the binning operation. One methodology is to linearly cluster the values and let the data choose the best bin ranges. Alternatively, the binning operation may be combined with the feature test evaluation.

Decision tree methodologies also utilize a process called pruning to reduce the complexity of the tree. Some of the methodologies utilize a validation set to gauge the effectiveness of pruning. Some use only the training data to identify branches to be pruned. It may be largely unnecessary to hold back data from the training set to validate pruning. A pruning methodology may be as simple as specifying a minimum node count. Pruning may also be accomplished by attempting to merge branches of a tree into a single branch through conjunctions and/or negations of feature tests. Some researchers believe complex trees should be pruned until they are compact and readily understandable to humans. Others point out that complex systems may lead to seemingly complex decision trees.

Decision tree methodologies are examples of supervised learning. These methodologies are subject to the same hazard of overtraining that plagues other supervised learning methodologies. Overtraining amounts to learning signatures of the training patterns, rather than learning underlying relationships between the training patterns. An overtrained model may adequately predict outputs for patterns in its training set, but does not generalize to predict well for patterns which were not in the training set. In order to minimize the risk of overtraining, trees may be grown using a training data set and tested using a test set, or may be pruned to remove branches that are idiosyncratic to the training data. Alternatively, some type of stopping condition may be applied.

2. Exemplary Applications of Decision Trees

The tree in FIG. 7 resulted from constraining the tree to only two levels, to keep the tree and related rules relatively simple. However, even with this constraint, it is possible to make relatively strong statements related to the two most significant features. The following features are included in the example corresponding to FIG. 7: viscosity, surftens, persolids, nipclear, ra, rp, rl. These features are chemical properties of a coating formulation and are used to predict the thickness of an applied coating.

Neugents® technology provides unsupervised and autonomous agents, which are very good at modeling and predicting behavior and at predicting probabilities of transition from one system mode-to another. Neugents can detect system behavior patterns which most humans cannot.

Two types of Neugents, Value Prediction and Event Prediction, might be utilized.

An Event Prediction Neugent is trained through clustering of historical data of a system's behavior, to look for specific types of events that are defined in terms of values and logical conditions in the input data. For example, an Event Prediction Neugent object is configured with the names of events to be predicted and definitions of the events in terms of the input data. The Neugent is then trained from historical data. In production, the Event Prediction Neugent is called to make an evaluation when provided new data, and the output is either a detection of a defined event in the data, a detection of an unusual situation, a prediction of an event, a probability of an event occurring within a future time period, or an alert that the system is behaving unusually compared to the historical data from which it was trained.

A Value Prediction Neugent is an implementation of neural nets for predictive modeling. A Value Prediction Neugent object is trained with a training set obtained from known input-output pairs from properly normalized independent and dependent historical data. In production, the Value Prediction Neugent is called to predict the values of dependent features when provided the values of independent features. For example, incoming data is passed through a Value Prediction Neugents neural network model, and the model estimates the value of an unknown variable. Some examples of value predictions include predicting inventory levels and predicting whether a client might buy a particular product.

Decision tree modeling may be an adjunct methodology to Neugent Value Prediction and Event Prediction models. Decision trees may assist a Neugent technician to find and include the significant features in the system model, and remove features which have little or no effect on the outputs to be predicted, to produce efficient and compact system models.

Figure 8:
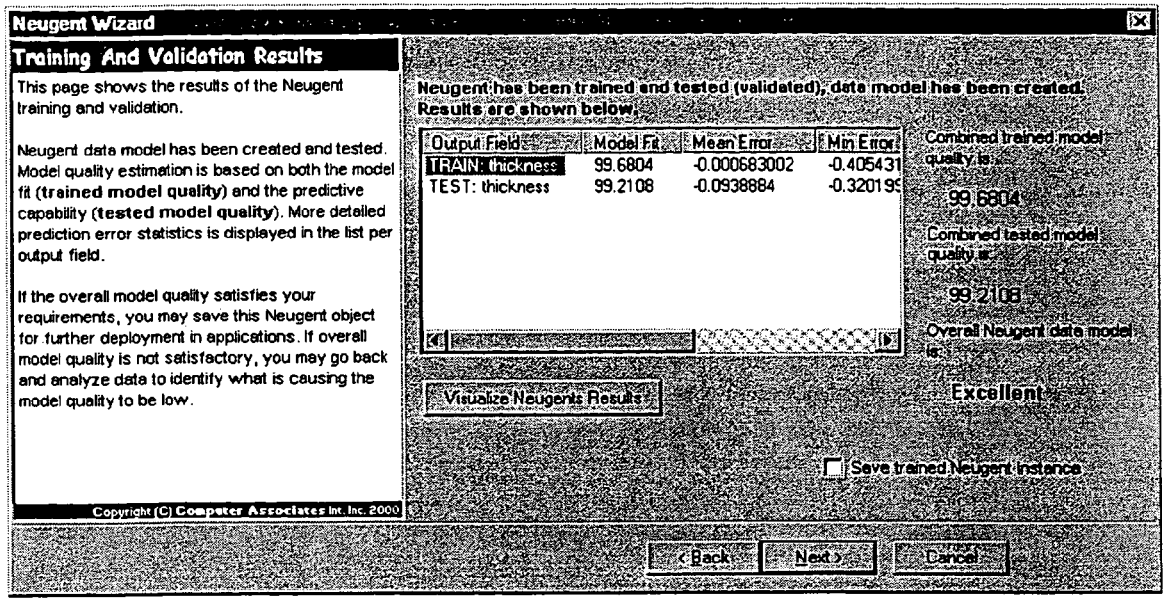
FIG. 8 shows a user interface reporting training and validation results for a model trained with all available features, in connection with the coating formulation example of FIG. 7.

In the coating formulation model, there were 84 patterns in the training set and 9 patterns in the test set. Results obtained by using all the available features are shown in FIG. 8.

Figure 9:
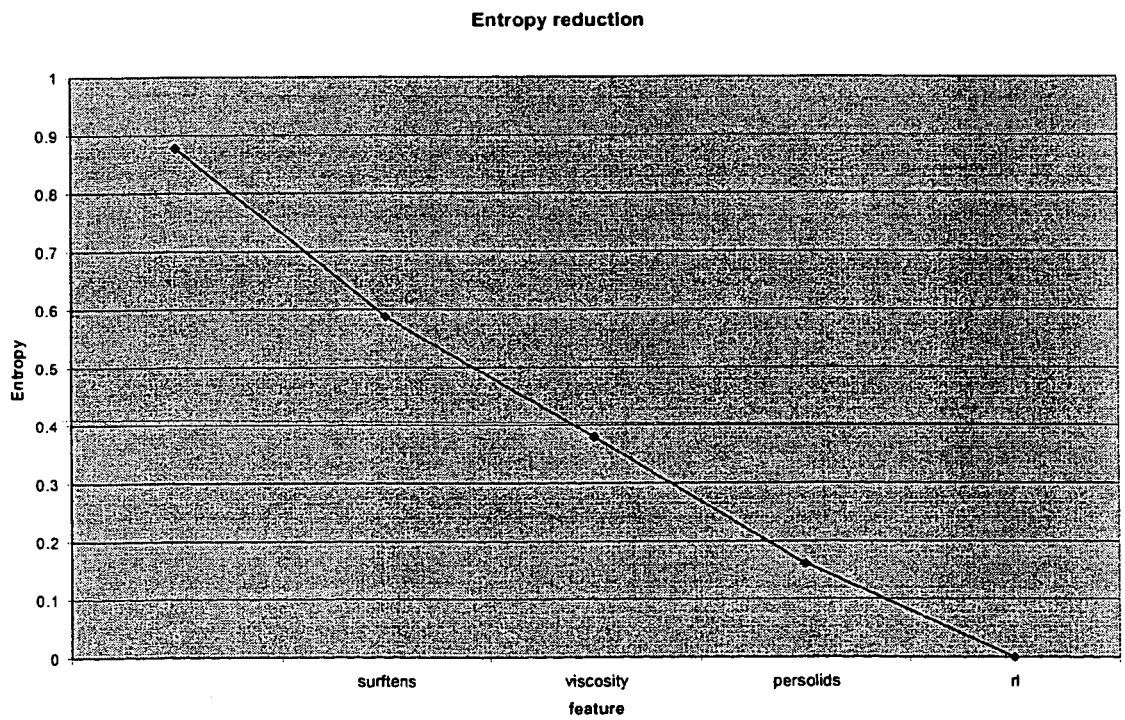
FIG. 9 shows a graphical representation of a relationship between selected system features and an entropy measure, in connection with-the coating formulation example of FIGS. 7 and 8.
Figure 10:
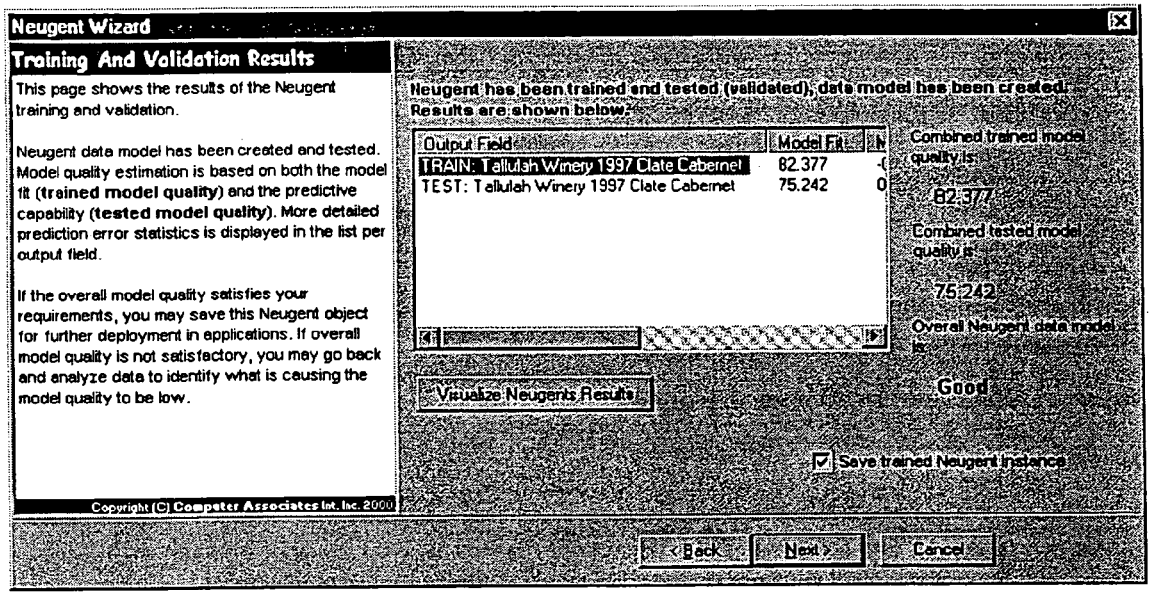
FIG. 10 shows a user interface reporting training and validation results for a model trained with the most significant features, in connection with the coating formulation example of FIGS. 7 and 9.

Applying discriminant analysis to select a feature set allows a reduction in the number of features for developing a good model. The significant features identified for the training set are, in order of significance, surftens, viscosity, persolids, rl. FIG. 9 shows the relative effect of each feature in characterizing the coating thickness. The relative effectiveness is measured by the drop in a measure called entropy. A Value Predict Neugent may be trained using only the four most significant features, which achieves results nearly as good as with the full set of features available. FIG. 10 shows the $R^2$ values obtained for the reduced feature set. There were no strong statistical correlations between any of the features in the full set.

In this example, the full set of available features produced slightly better $R^2$ values. However, the $R^2$ values for the reduced feature set are very acceptable and the model using the reduced feature set might be expected to generalize better on patterns not yet seen. In addition, use of discriminant analysis may produce rules which to some extent provide a view of inside the Neugent black box model. This type of insight into the relationships underlying the data helps the domain experts to validate and accept a Neugent model.

Figure 11:
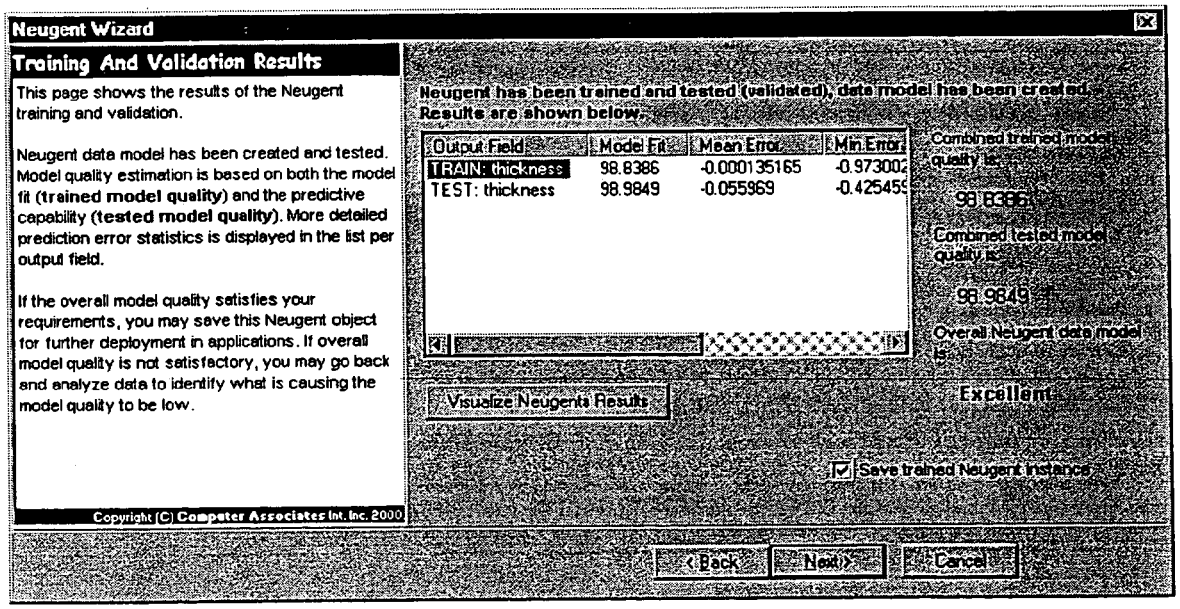
FIG. 11 shows a user interface reporting training and validation results for a model trained with all available features, in connection with an exemplary wine purchase model.
Figure 12:
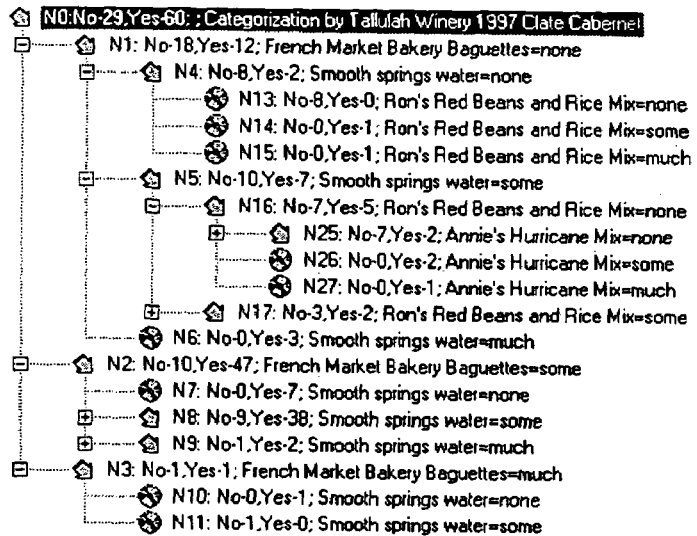
FIG. 12 shows a schematic representation of upper levels of an exemplary decision tree for the wine purchase example of FIG. 11.
Figure 13:
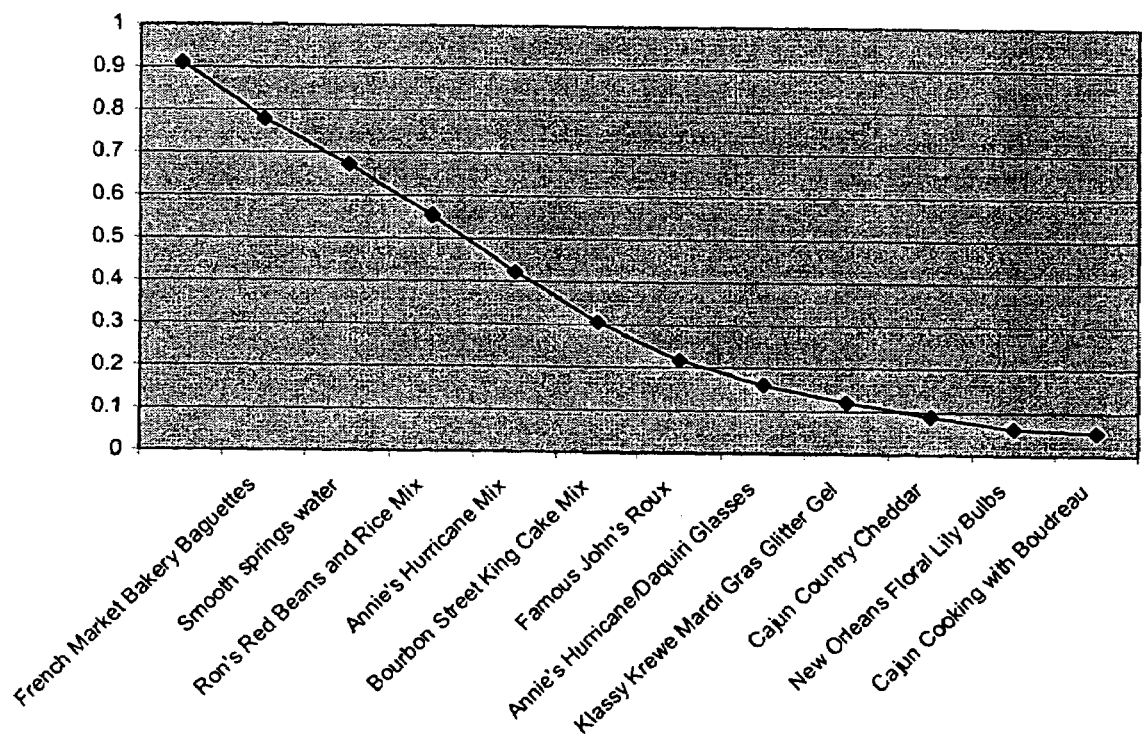
FIG. 13 shows a graphical representation of relative significance of features, in connection with the wine purchase example of FIGS. 11 and 12.

A second exemplary application uses data showing purchasing patterns in a store. Each pattern of the data contains purchased quantities of selected products. The goal is to identify what combination of product purchases are an indicator of a likely wine purchaser. With this knowledge, a wine retailer may target a sales promotion at customers who are most likely to purchase more wine. Data are present for 17 different products, versus the purchase of a specific brand of wine. FIG. 11 shows the results obtained using all 17 products for predicting wine purchases. FIG. 12 shows the upper levels of a decision tree for the wine data. FIG. 13 shows the relative significance of the products in the wine data.

Since the output is binary (i.e. whether wine was purchased or not), the $R^2$ is not the best measure of the effectiveness of this model. Instead a threshold is applied to the floating point output. Output values above the threshold indicate a wine purchase. Applying a threshold of 0.6 to the output of this model yields a training accuracy of 94.4% correct, and a test accuracy of 88.9%. The model made 1 wrong prediction out of 9 patterns in the test set.

Using only the four most significant features another Neugent model was trained. Upon applying the threshold to the Neugent outputs, a training accuracy of 93.3%, and test accuracy of 88.9% was obtained. The Neugent model using the full set of features and the model using only the top four features each produced the wrong result for the same test pattern. Accordingly, a reduction from 17 to four features yielded essentially the same model performance. Two of these features were completely static and they were eliminated by conventional pre-processing. However, there were no strong correlations between the remaining features. The relative unimportance of many of them are not readily apparent.

A third application involves using discrimininant analysis to help in feature selection for Neugents to model performance of a Help Desk system. The goal was to predict whether a help desk call is likely to be solved in the time allotted according to a Service Level Agreement (SLA).

Figure 14:
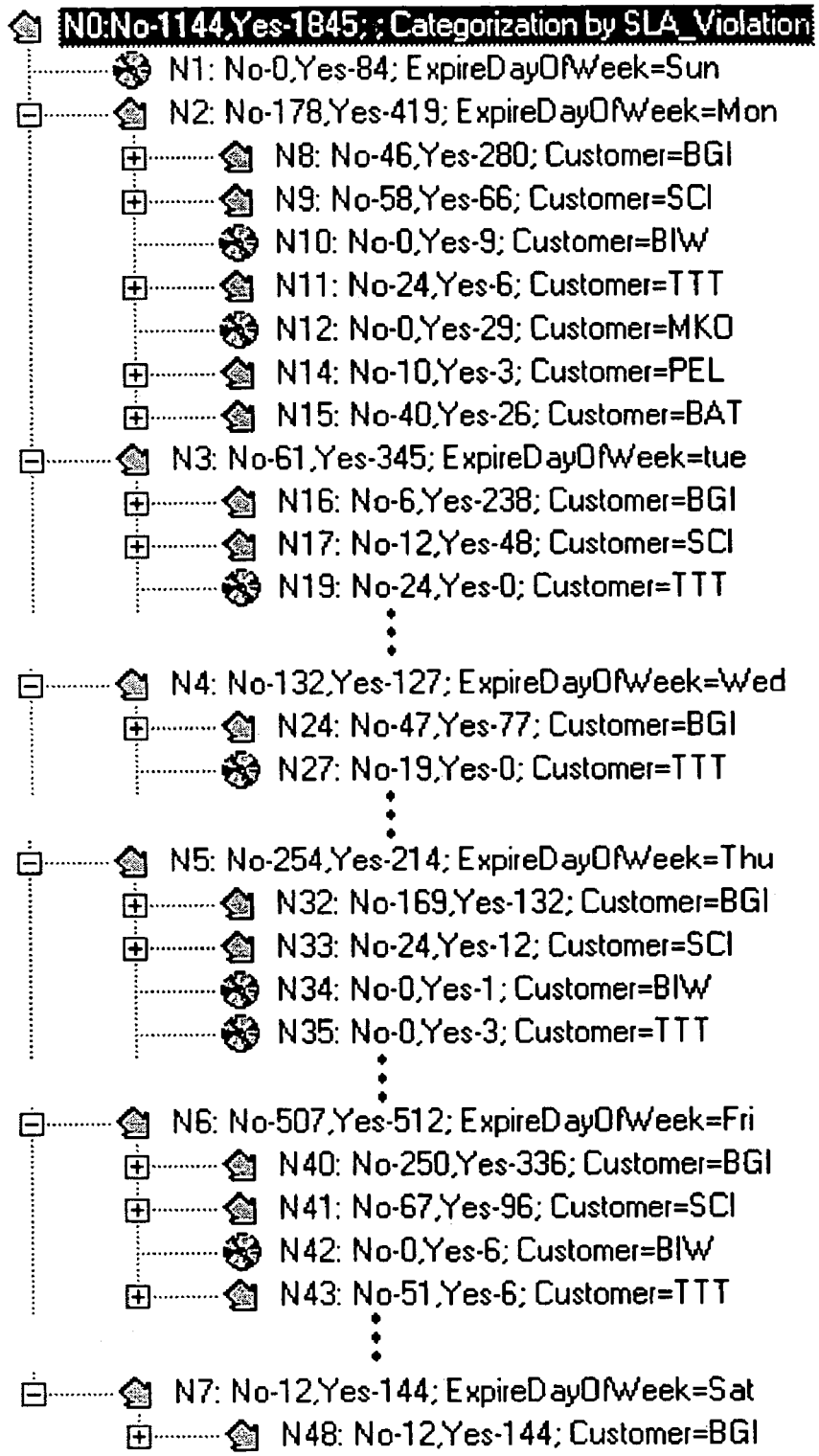
FIG. 14 shows a schematic representation of top levels of an exemplary decision tree for modeling a help desk system.

Based on general knowledge about the nature of the data, various direct and derived features were compiled into patterns. Neugent modeling using the full feature set produced relatively poor results. Applying discriminant analysis produced a reduced set of significant features which produced acceptable predictions. Since the desired output of the model is binary prediction, a threshold is applied to the continuous valued output to constrain it to 0 or 1 (i.e. SLA violation or not). Again, the $R^2$ value is not useful in evaluating this type of Neugent model. After applying a threshold, the accuracy of the model on the test set was in the range of ~90% correct. The second most significant feature identified was the customer code, which might be expected to have a strong effect on SLA violation rate. However, there was an interesting aspect related to the most significant feature. This feature is the day of the week that the call might have gone into violation. FIG. 14 shows the top levels of a decision tree for the help desk data.

The performance of the help desk for a specific call apparently varies depending on the day of the week the call is made. The overall violation rate is about 61.7%, but it varies considerably over the course of the week, as follows: Sun—100%; Mon—70.2%; Tue—85%; Wed—49%; Thu—45.7%; Fri—41.5%; Sat—92.3%. It is highest in the beginning of the week and somewhat high towards the end of the week. A possible explanation is that there is more time and/or resources available to service calls in mid-week.

3. Additional Decision Tree Methodologies

ID3 (Iterative Dichotomiser 3) is a non-binary method which uses an information theoretic measure of information gain for a diversity function. C4.5 and C5.0 are successors of ID3 which utilize an entropy measure and provide additional strategies for pruning trees and for limiting tree growth.

Information gain is the decrease in system entropy following the application of a selected feature test. Entropy is a measure of disorder or non-homogeneity within a system. Each node at a selected level of the tree has a certain entropy and the node entropies are combined as a weighted sum to yield a system entropy for the tree level. At each level the test which provides the largest decrease in system entropy, or information gain, is selected as the best possible test at that level.

C4.5 and C5.0 use a measure called gain ratio instead of information gain as the diversity function. Gain ratio is the information gain from a feature test divided by the number of subsets created by that test. This measure penalizes the type of test mentioned above, which fractures the data set (e.g., person's name). If there is another test which provides a reasonable information gain with far fewer subsets in the partition, it is chosen instead.

In regard to pruning, ID3 utilizes a bonsai type pruning technique of simply stopping tree growth based on a minimum node size, or specifying an acceptable minimum entropy at which to quit testing. C4.5 and C5.0 provide a strategy for pruning a branch from the tree based on Bernoulli's binomial formula. According to the C4.5/C5.0 pruning strategy, an error rate is determined for each node, by designating the node as a leaf node for the class which predominates in that node and determining the number of items which are mis-classified. It then assumes the observed error rate is overly optimistic and substitutes a more pessimistic error rate, using the binomial formula and a selected confidence level. If a branch yields an increase in error rate after the pessimistic substitution, it is pruned. C4.5 and C5.0 use the training data for pruning as well as training. Utilizing the training data to implement pruning might be efficient. As an alternative to using the training data, one might consider using test data along with the binomial formula to implement pruning.

C4.5 and C5.0 also may use a grouping function for combinations of feature tests at each level. This may detect synergistic effects whereby two tests applied simultaneously are more effective than each applied singly.

C4.5 and C5.0 employ a separate module to generate rules from the decision tree. For other methodologies this might be considered another type of pruning, whereby multiple branches may be merged into a single branch through conjunctions and negations of feature values.

Chi-squared Automatic Interaction Detection (CHAID) is a methodology which differs from ID3, C4.5 and C5.0 in a number of ways. CHAID uses the Chi-squared function as a different diversity function. When applying the Chi-squared diversity function, CHAID stops tree growth before overfitting occurs. Therefore, pruning after the tree is built is unnecessary. In addition, it deals with strictly categorical variables. Accordingly, continuous variables are binned prior to beginning the tree generation procedure. ID3, C4.5 and C5.0 may use dynamic binning of continuous variables, perhaps based on information gain. Like ID3, C4.5 and C5.0, CHAID is a non-binary methodology.

CHAID compares the relative effectiveness of each possible feature test. The Chi-squared test, a statistical significance test, is used in a number of ways in the CHAID methodology. The number of branches allowed by a feature test are limited to those which produce statistically significant splits. Further, when comparing the results of each feature test, splits which produces the most significant results according to the Chi-squared test is the winner at each level. The Chi-squared test is used to halt growth of the tree when further feature tests stop producing statistically significant results. This last determination involves the use of a significance threshold, and this is the main tuning parameter available with the CHAID methodology.

Exhaustive CHAID is a variation on CHAID. When evaluating the possible branching factor for each feature test, it progressively merges the possible branches into two groups that are most self-similar according to the Chi-squared test. This basically constrains the tree to become binary.

Classification And Regression Trees (CART) is a binary tree methodology. Like the ID3/C4.5/C5.0 family, CART may use different diversity functions to measure the effectiveness of each feature test. The following diversity functions may be used:

(a) $\min(P(c1), P(c2))$, where $c1$ and $c2$ are the two possible result classes for the test, $P(c1)$ and $P(c2)$ are the relative frequencies of $c1$ and $c2$;
(b) $2*P(c1)*P(c2)$; and
(c) $[P(c1)*\log(P(c1))]+[P(c2)\log(P(c2))]$, also called the entropy or information gain measure.

The diversity function is evaluated before and after each feature test, and the one which provides the largest decrease in diversity is declared the winner. This proceeds much as the other methodologies until the feature tests are exhausted, or until an arbitrary stopping point is reached (e.g., minimum node count).

CART uses an adjusted error rate function $[AE(t)=E(t)+a*LeafCount(t)]$ to generate a pool of candidate subtrees. The first candidate is selected as follows. The adjusted error rate is calculated for the possible subtrees containing the root node, as a parameter is gradually increased. When the adjusted error rate of a subtree becomes greater than that for the root node, then that subtree is pruned. The second candidate is chosen by repeating this process starting with the first candidate subtree. The process continues until only the root node remains. A validation set of data, which was not used in the training data, is used to select among the pool of pruned candidate subtrees. The subtree with the lowest overall error rate on the validation set is declared the winner. Sometimes a cost function (e.g., some weight multiplied by the probability of misclassification) is applied along with the error rate to evaluate the best subtree. A third test data set, which is exclusive of the training and validation set, may be used to gauge the prediction or classification capabilities of the final subtree.

4. Binning Considerations

Except for data which is completely discrete, binning is a pre-processing step which may be performed for the above described methodologies. The technique is to pick n bins, with equally spaced ranges throughout the observed range of the data. As mentioned above, it is also desirable to minimize the number of bins to avoid quickly fragmenting the data into numerous non-representative subgroups.

Figure 15:
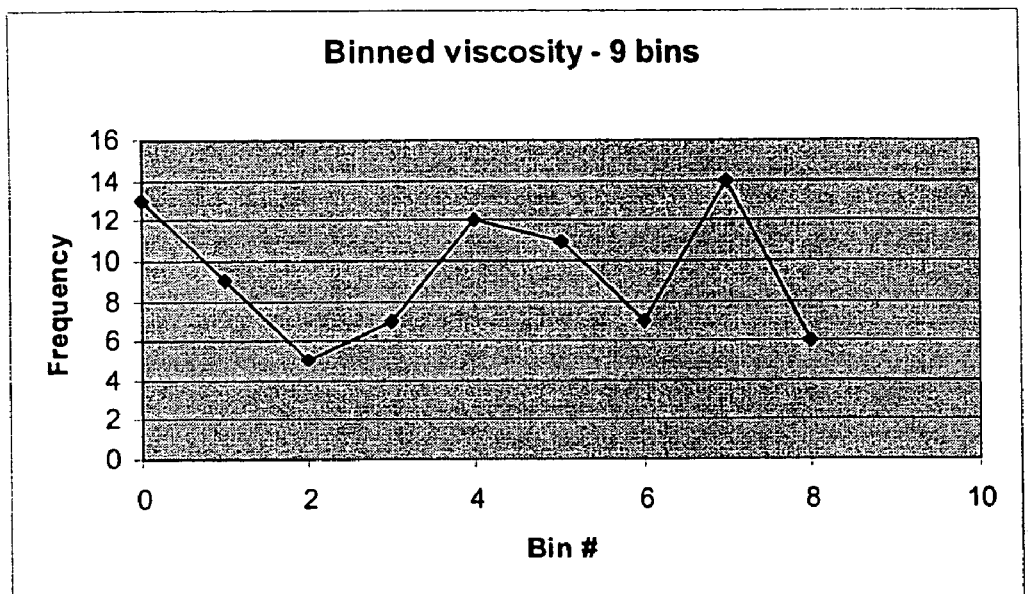
FIG. 15 shows a graphical representation of binning for a selected feature, in connection with the coating formulation example of FIGS. 7-10.
Figure 16:
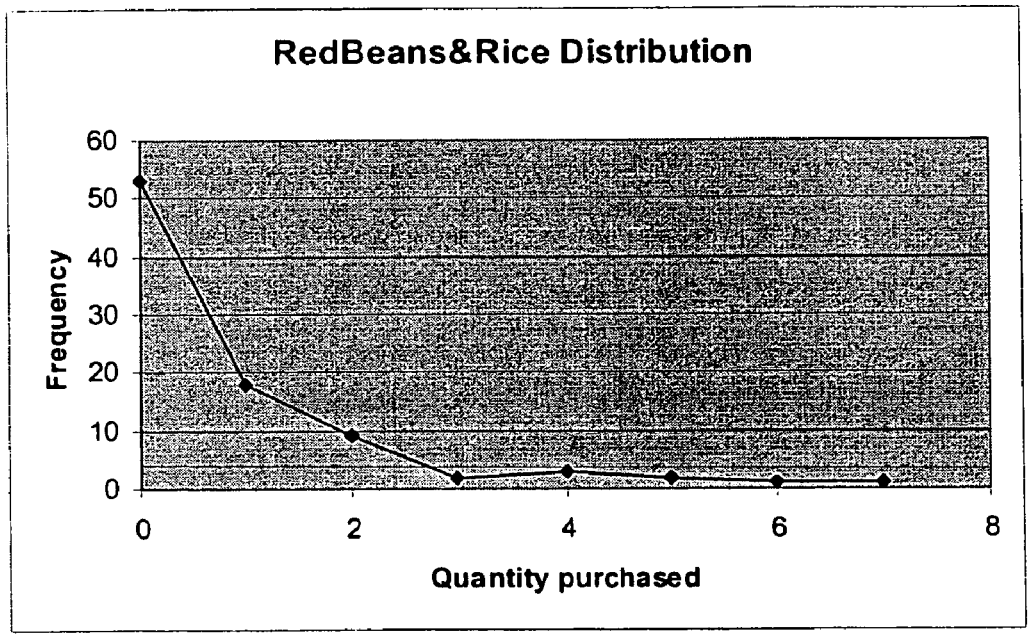
FIG. 16 shows a graphical representation of binning for a selected feature, in connection with the wine purchase example of FIGS. 11-13.

For the data shown in FIG. 15, corresponding to the coating example above, this type of linear binning might be suitable. FIG. 16, corresponding to the Wine example, shows feature data which might be considered more exponential in appearance.

Linear bin limits were used for the coating and Help Desk applications. For the Wine example, account was taken for the exponential appearance of most of the feature data, and purchase quantities above a certain value were binned together. This exponential appearance may be characteristic of purchasing data, as purchasing large quantities of consumer goods is relatively rare.

Figure 17:
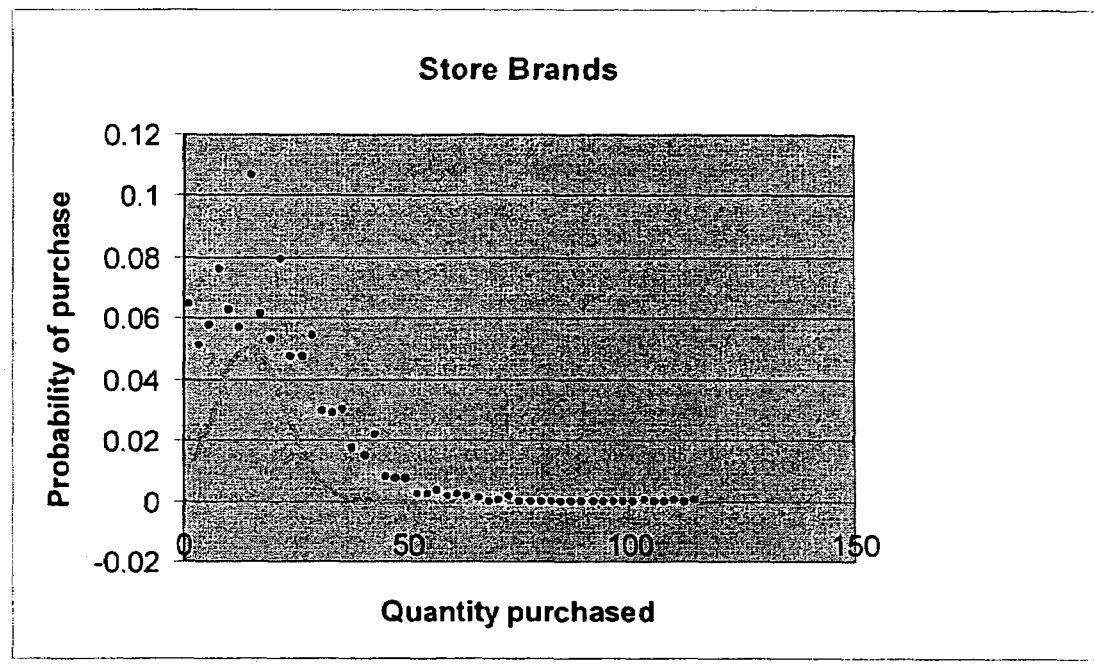
FIG. 17 shows a graphical representation of purchase tendencies and a selected feature, in connection with the wine purchase example of FIGS. 11-13.

One might expect other distributions, particularly the normalized distribution (i.e. the bell-shaped curve), to occur. FIG. 17 shows the distribution of Store Brand purchases in the Wine example. Fitting this data to a normalized curve yielded a mean of about 15 purchases of store brands, with a standard deviation of about 8. This feature may produce into three bins—bin1: quantity purchased less than the mean minus 1 standard deviation (i.e. 7 items or less); bin2: quantity purchased within the mean+/−1 standard deviation (i.e. 7 to 21 items); bin3: quantity purchased greater than the mean plus 1 standard deviation (i.e. 22 or more items). An automated binning tool may take account of the distributions present in the individual feature data, and bin accordingly.

Meta-data or a priori knowledge may also be used, when it is available. For instance if a feature is known to be a date, it might be useful to represent the date as a day of the week and bin it accordingly.

5. Pruning/stopping Conditions

As mentioned above, tree-pruning is crucial to applying decision trees independently. The dependence of decision trees on binning and pruning considerations are some, of the reasons, they are considered complementary tools to standard Neugent technology. Pruning methodologies may be utilized, even as an adjunct to Neugents.

It often occurs in the tree building methodologies that a feature test which is very effective for a branch of the tree (i.e. for some sub-population of the universe) is not selected as the most effective for the entire level of the tree. This has the result that locally effective tests may appear less significant than they possibly should be. Or their significance may be masked entirely. This also has the result of clouding or obscuring any rules related to that branch of the tree. This effect might be mitigated by various of the pruning procedures. Another alternative to pruning is selection of multiple features at each level of the tree, in order to find optimal feature tests for each sub-population. However, it likely increases the computational complexity of the methodology.

Other types of stopping conditions may be used as well, such as maximum tree level, or for ID3 a minimum entropy or minimum entropy drop. For on-line applications in which time may be at a premium, a maximum time to process a tree level, or the total tree, may be specified.

6. Efficiency and Large-scale Data Set Considerations

Each of the methodologies use a pass through the data set for each feature test which is evaluated. The binary and non-binary ones cannot be directly compared, as applied to a given data set, because they have different numbers and types of features. The effort of arbitrary binning or adaptive binning and feature test evaluation are comparable for the methodologies discussed above.

Comparison of pruning operations is less straightforward. CHAID, which eschews pruning altogether might seem to be the winner here. Using limited pruning with C4.5/C5.0 appears to be less calculation intensive than CART. However, if the effort to apply C4.5/C5.0's rule generation module is expended, their total pruning load are comparable. Although C4.5/C5.0 has the benefit that it uses the training data to validate pruning, CART reads a test set or holds back training data.

If one assumes that many of the modeled systems contain continuous feature variables, then the effort to re-frame the features to a binary format provides an edge to the non-binary methodologies.

Sufficient statistics is a table of counts of occurrences and co-occurrences of the possible features. This is performed to minimize the amount of information held in RAM while the feature tests are recursively applied. This methodology has the following two side effects. If one is dealing with continuous variables, or in the case of binary trees with ordinal valued features, in order to generate bin counts, the bin ranges already are decided upon. Any forms of dynamic binning (e.g., to maximize information gain) are forgone. Also, one loses track of what individual patterns in the data set contributed to the formation of a selected branch of the tree. Once confidence has been gained in an applied methodology, this knowledge may be only of academic interest however. Another factor not considered in this single-pass methodology is how to determine the ultimate range and possibly scaling of the feature values. With a suitably indexed database, minimum, maximum and possibly other statistics might be obtained with a query, without the cost of a total database scan. For other data sets, this amounts to another scan, or the data is held in memory. If scaling and binning can be settled independently of the decision tree methodology however, this may be an attractive option for large data sets.

As a practical matter, one might be faced with a finite number of passes through a database, to handle the effects described in the previous paragraph. Two passes, with the first to gather bin statistics, might be sufficient in most applications.

7. Decision Tree Products

There are numerous software vendors or other sources, which supply software or function libraries implementing one or more of the above decision tree methodologies. Listings of such sources may be found on the web.

Some of the factors in the selection of a decision tree tool are the following. The decision tree tool is used as an adjunct methodology and not as the principle means of modeling a system. However, of the commercial decision tree applications typically are used as the sole or primary means of system modeling. A modeling tool typically has features to account for various distributions in its binning operations.

A second factor is that real-world applications very often involve continuous valued data. The effort to re-cast problems to a binary-valued format may be motivation for adopting one of the non-binary tree methodologies.

Since real-world data mining applications may involve very large amounts of data, a modeling tool ideally enables a single-pass through a database to gather a reduced set of sufficient statistics, as discussed above. When working towards a single-pass tool, binning parameters are decided before, or early in, the scan process. However, a modeling tool may include options to use both static and dynamic binning.

C. Exemplary Help Desk Application

Figure 18:
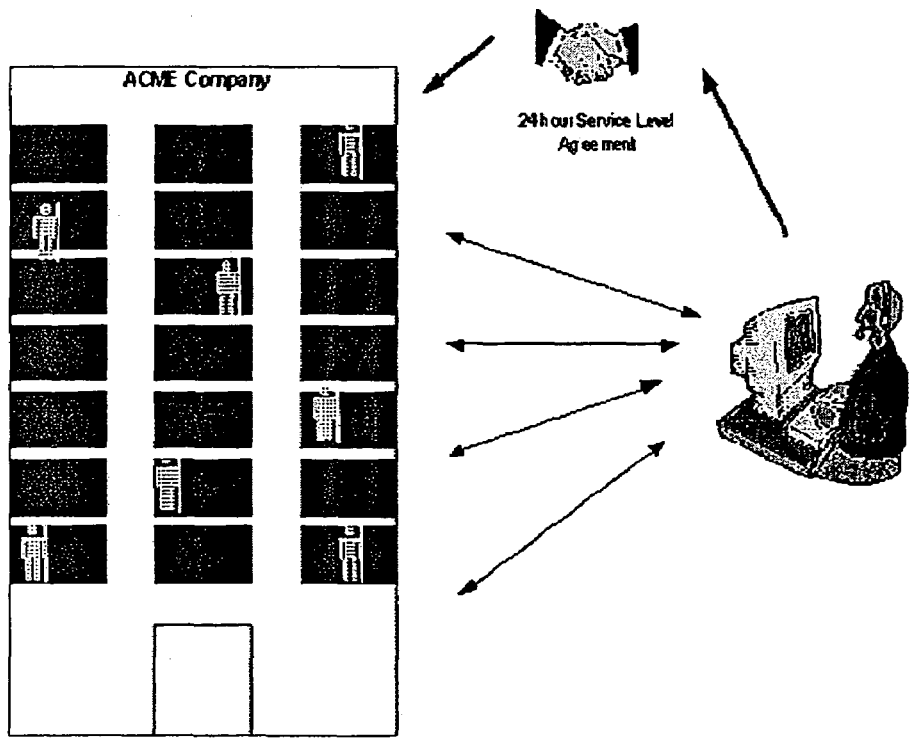
FIG. 18 shows a schematic representation of an exemplary help desk system.

FIG. 18 illustrates a Help Desk system. A fictional ACME Company contracted their computer support to an outside service. To ensure a high quality of service, a SLA was put into place, committing the outside service to resolve reported problems within 24 hours.

The Help Desk system may be modeled, by incorporating the methodologies of this disclosure, to predict whether a call is serviced within the 24 hours required by the SLA. An Advanced Help Desk (AHD) software tool may be provided to assist managers and call center technicians in anticipating problems that may adversely affect customer service levels.

Various features were identified through an AHD tool to have an influence on whether a call will be serviced in a timely manner. Examples of features might include the group or customer reporting the problem, the priority of the problem, etc. One feature which may be significant is the problem codes associated with the call. Thousands of possible codes may be defined in the problem tracking system, hundreds of which were actually represented in the data. Including all possible, or even probable, codes in the modeling effort may be inefficient. In addition, one might expect that over time the mix of problem types may evolve. The solution is to model on codes which are most significant to SLA violations, at any particular time. Discriminant analysis is used to select the top P most significant codes and include them along with other significant features. A baseline significance signature of problem codes is maintained.

Figure 19:
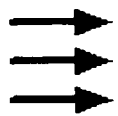
FIG. 19 shows a tabular representation of problem codes ranked by significance, in connection with the help desk system example of FIG. 14.
Figure 20:
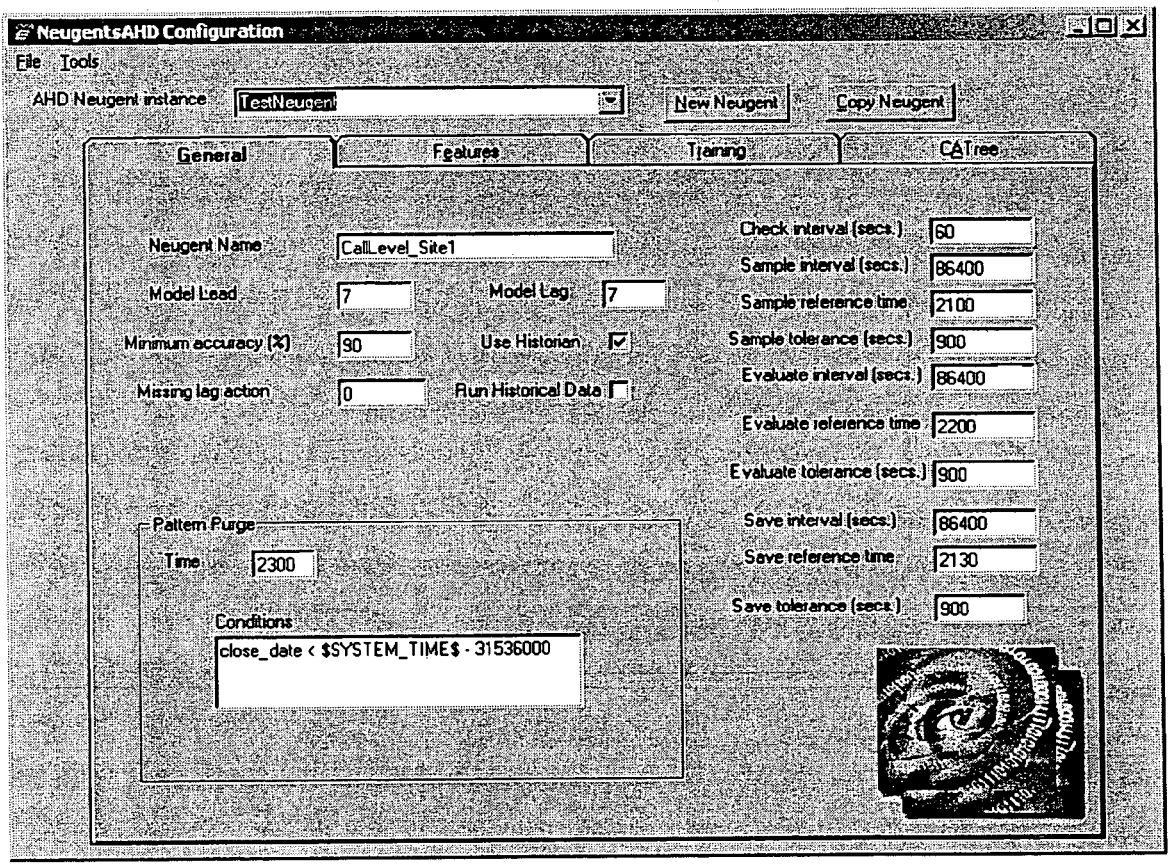
FIGS. 20-23 show exemplary user interfaces for configuring the help desk model of FIGS. 14 and 19.
Figure 21:
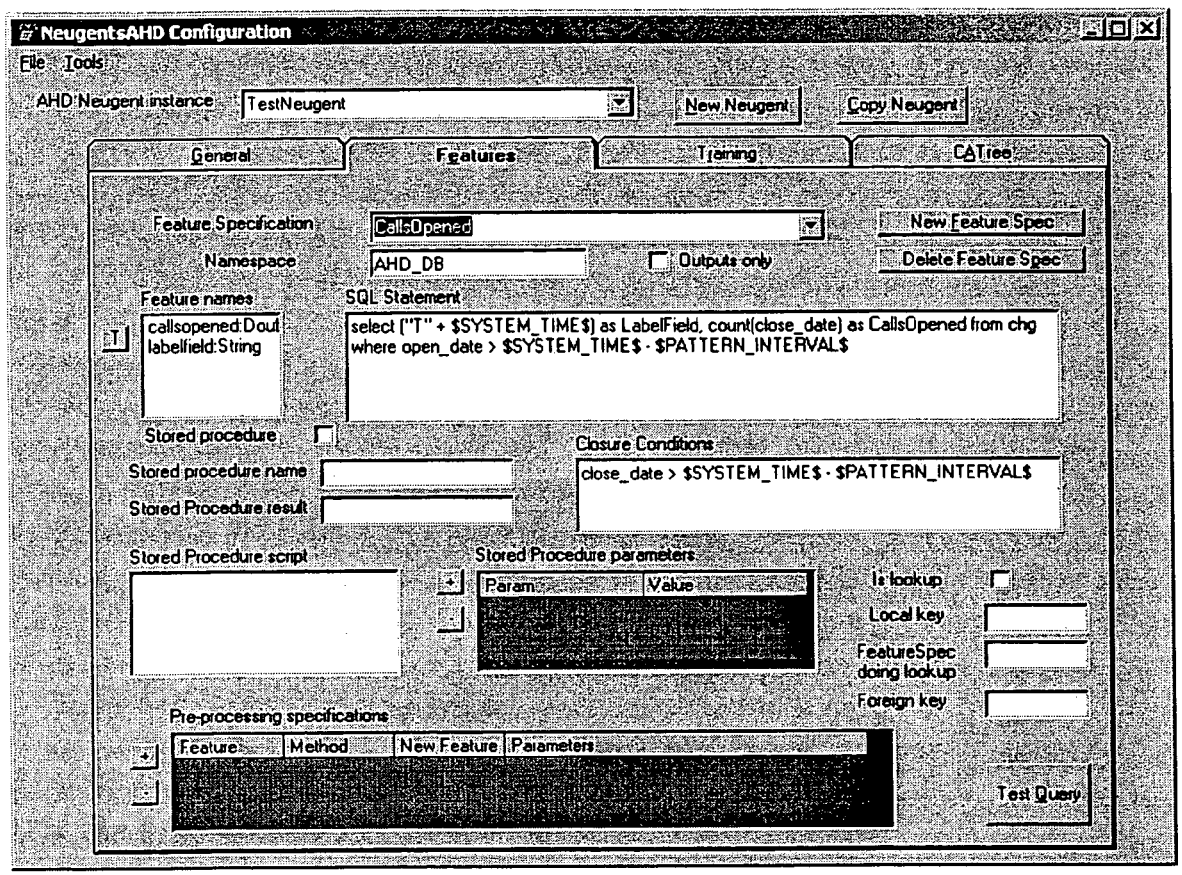
Figure 22:
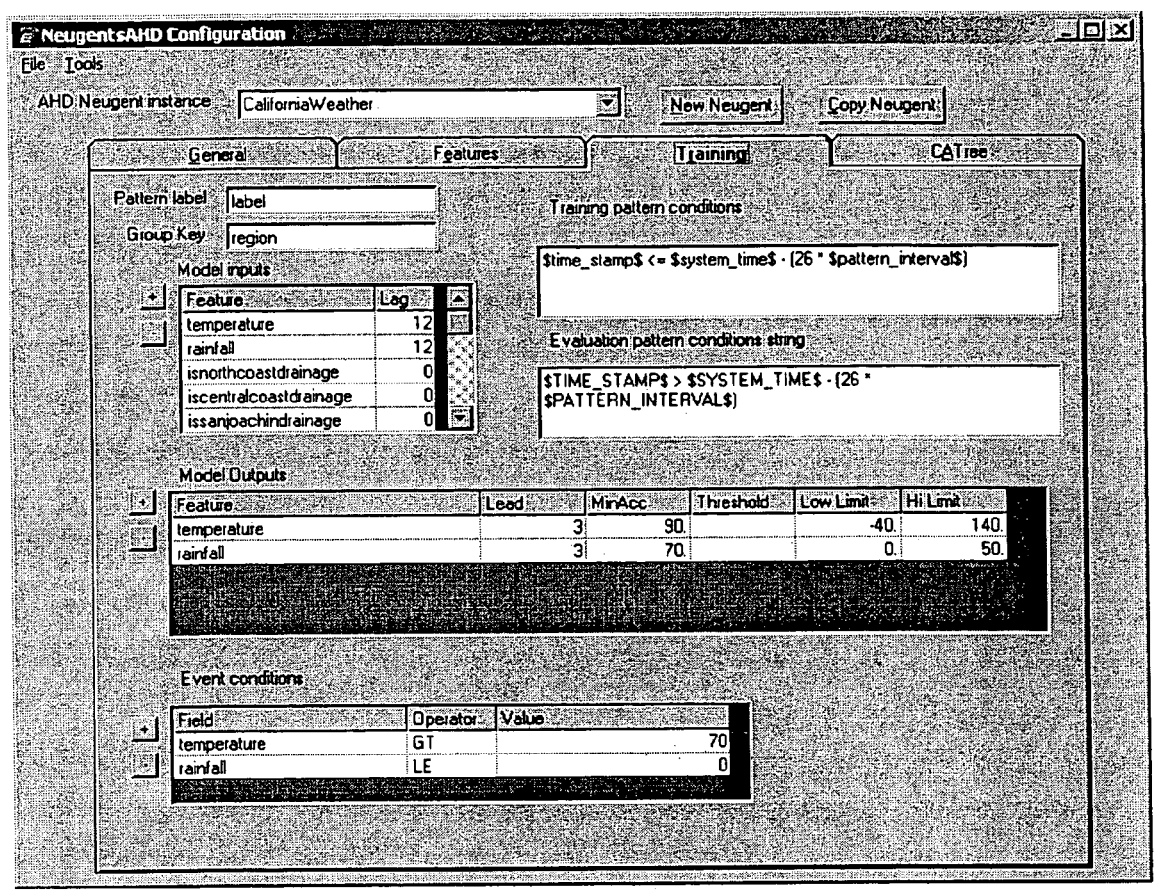
Figure 23:
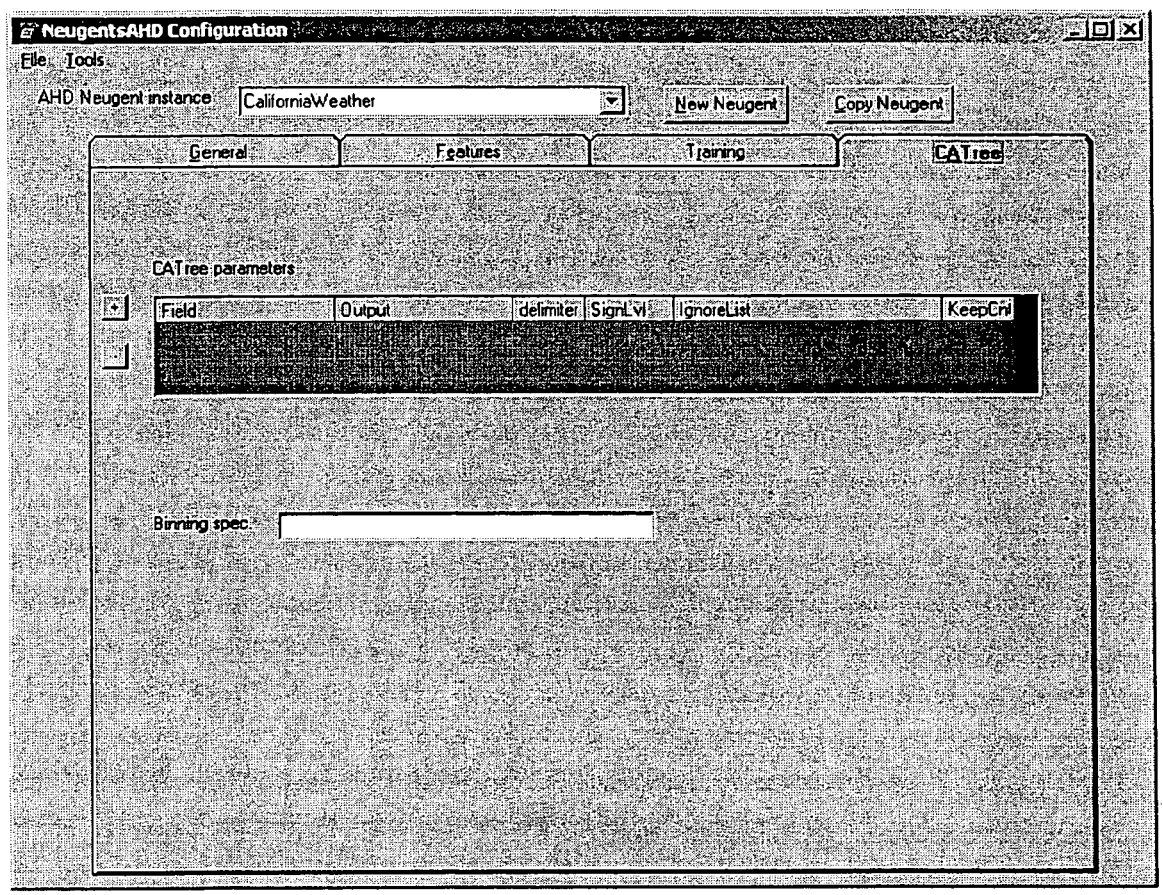

As outlined above, model accuracy is periodically measured and the model is retrained, if necessary. Next, the significance signature is regenerated, and the codes to model on adjusted as necessary. FIG. 19 illustrates an example of how the mix of problem codes may change over time. The presence of new codes at a higher ranking probably signifies a shift in the types of problems being reported to the Help Desk and a corresponding change in how well the Help Desk can resolve the current issues.

Inclusion of these codes in the modeling effort, while not being the most significant features for this system overall, enabled the required prediction accuracy to be achieved with the system model. Utilizing the significance signature enabled quick detection of system evolution and model adaptation and retraining. This is an example of using the significance signature to tune a model's usage of a small but volatile part of a system. Also, a superset of possible features was not maintained online in this case because the input features involved are derived from a single field.

Figure 29:
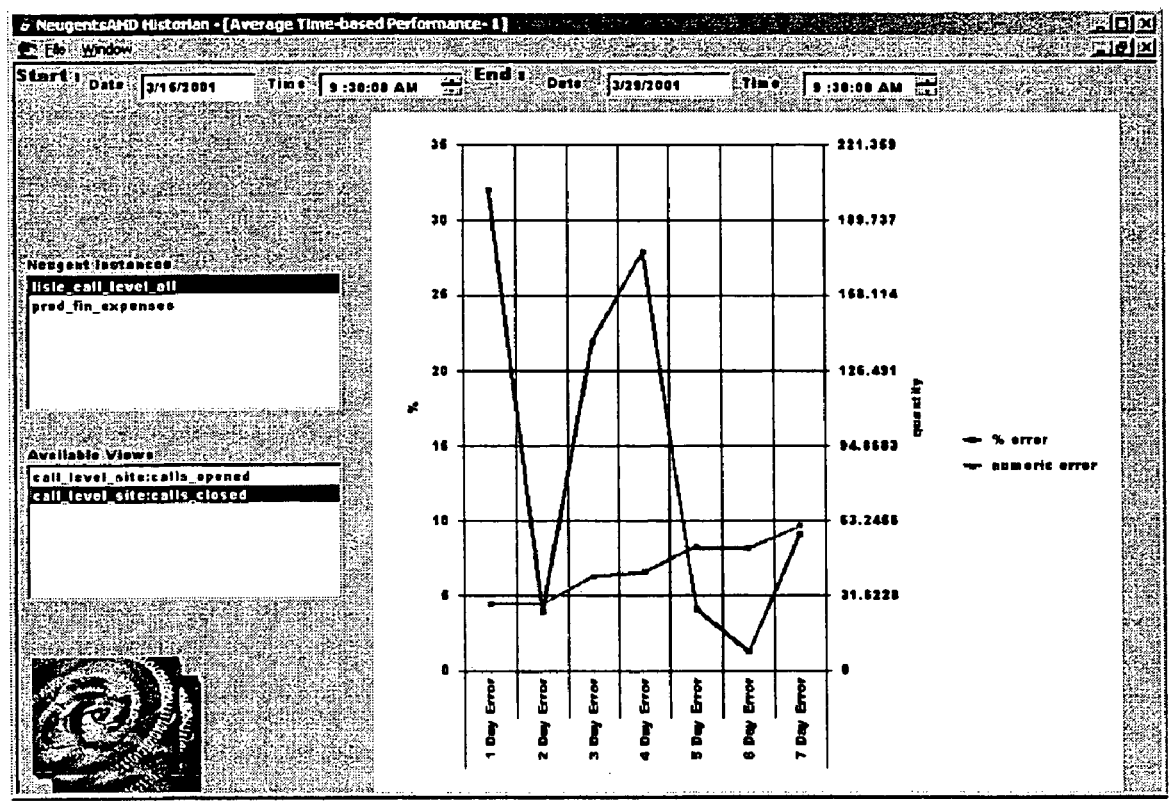
Figure 30:
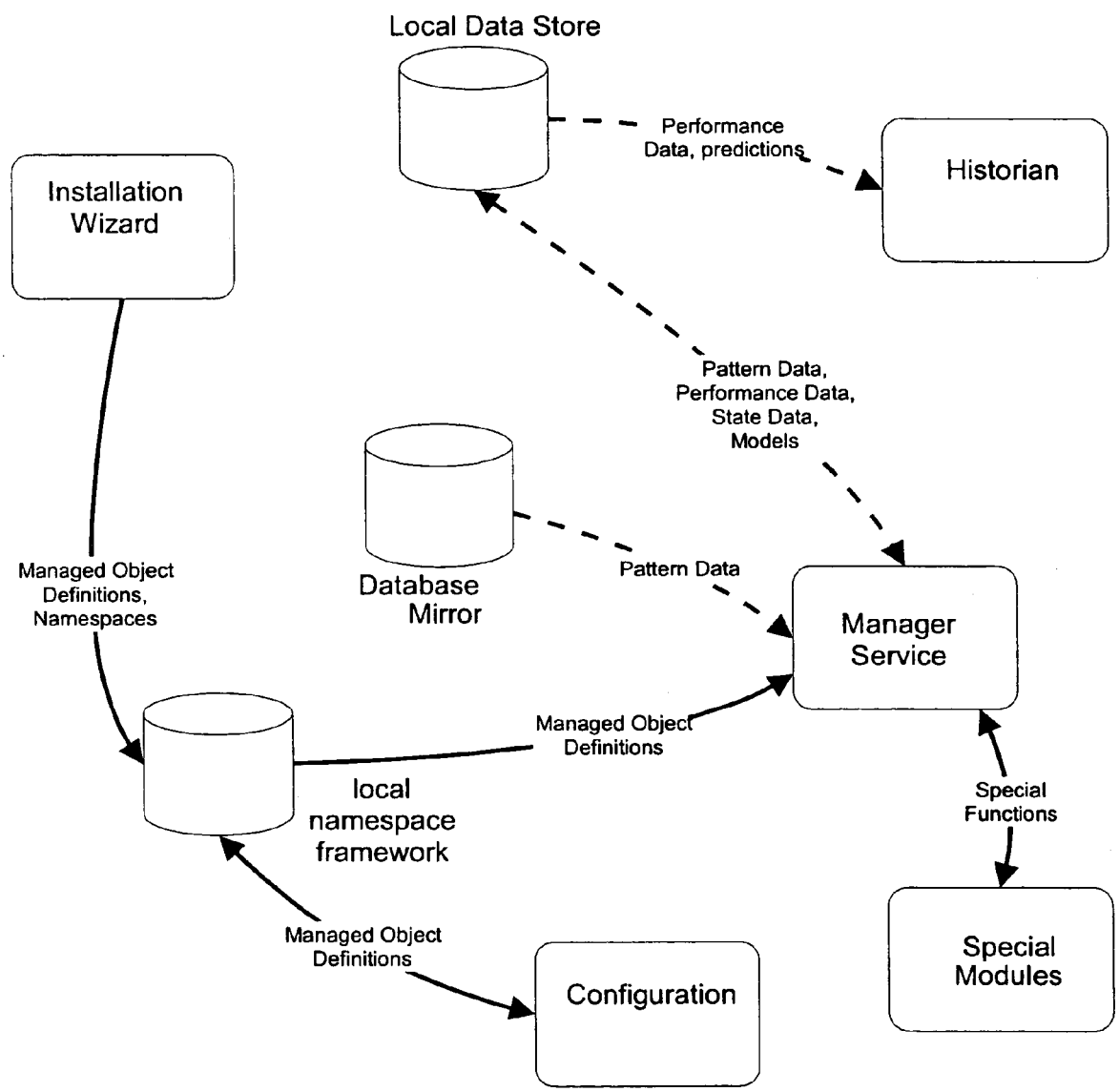
FIG. 30 shows a high-level block diagram of a help desk modeling system.
Figure 31:
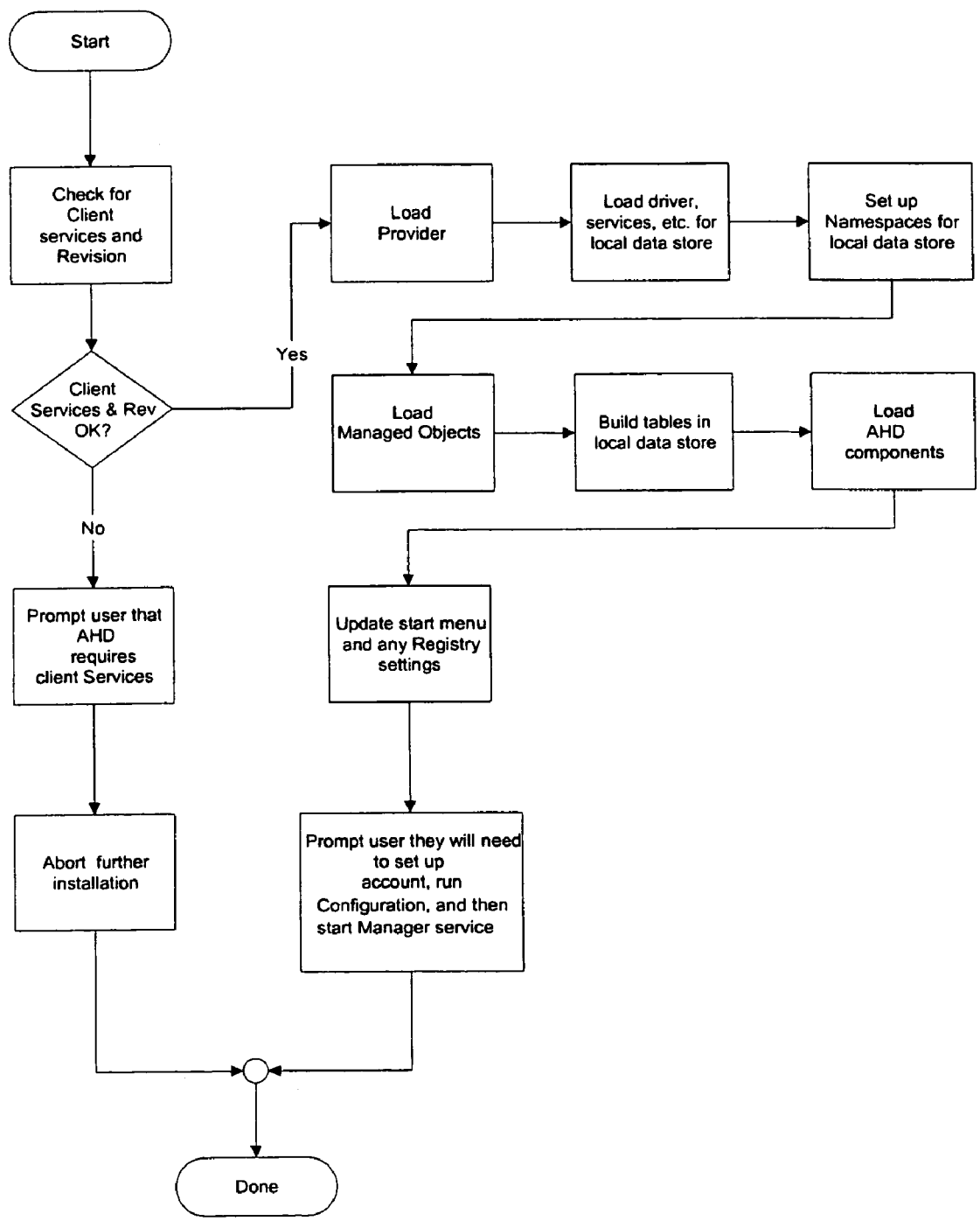
FIG. 31 shows a flow chart for an installation wizard of the help desk modeling system of FIG. 30.
Figure 32:
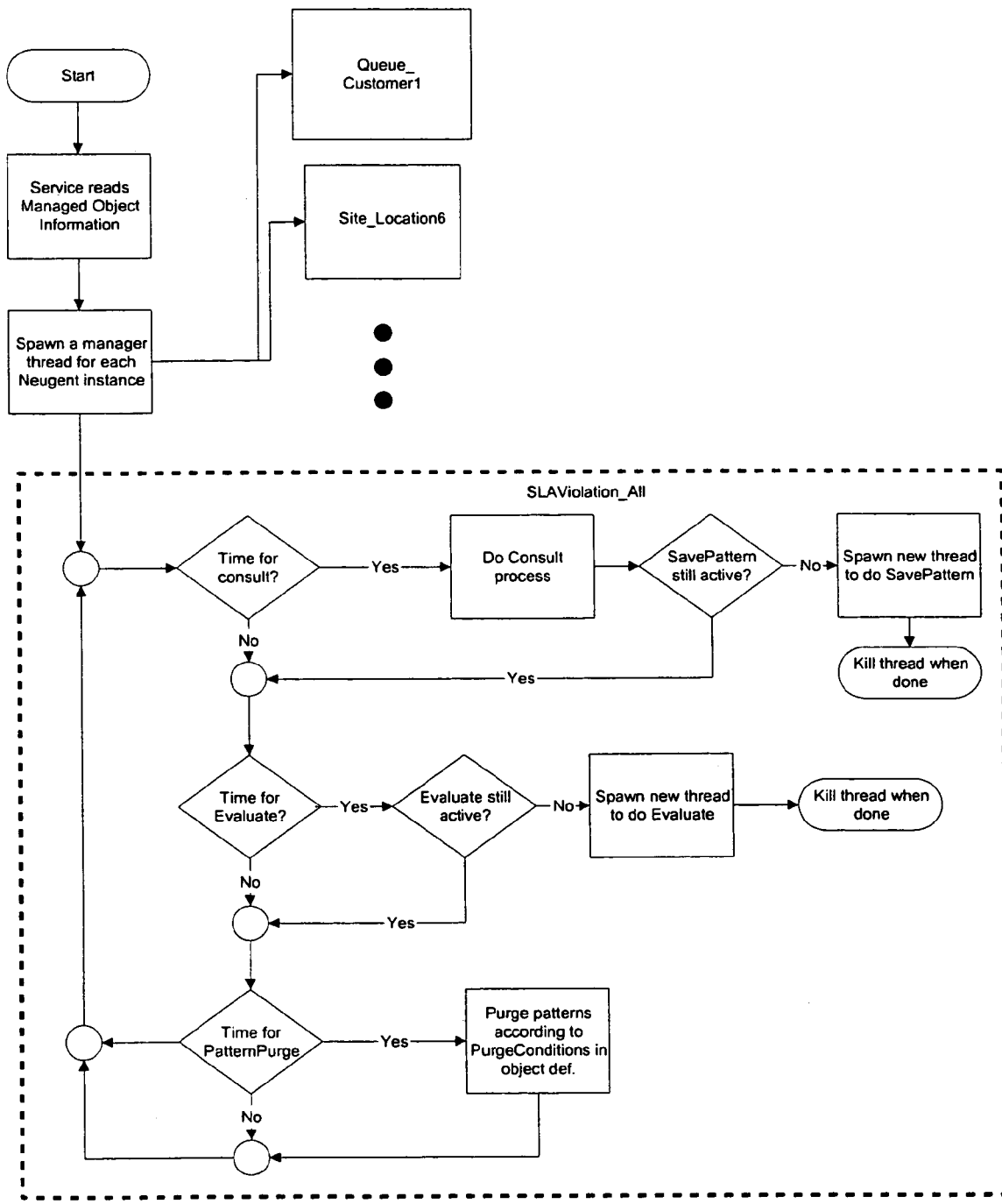
FIG. 32 shows a flow chart for a manager service of the help desk modeling system of FIG. 30.
Figure 33:
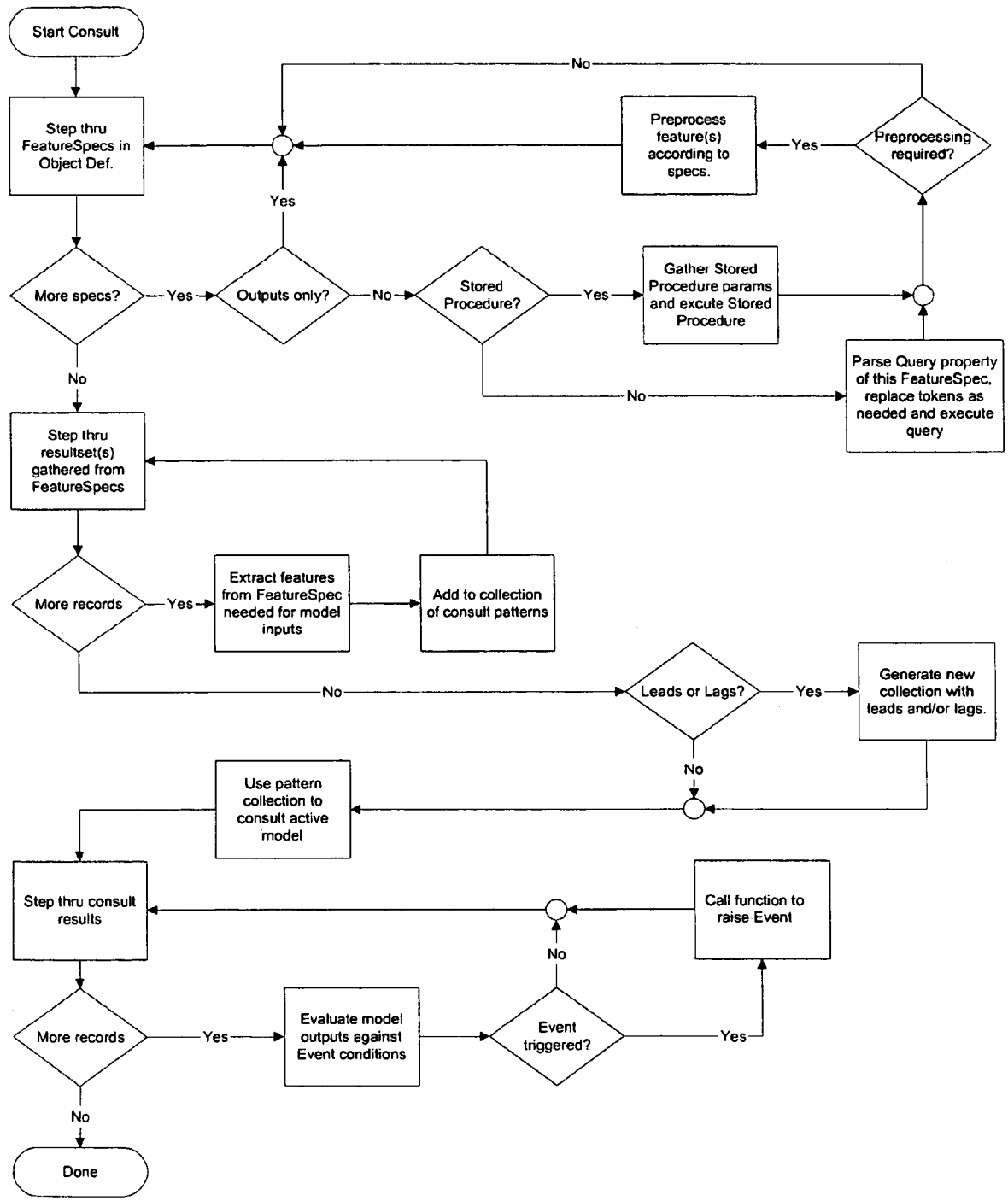
FIG. 33 shows a flow chart for a Consult module of the help desk modeling system of FIG. 30.
Figure 34:
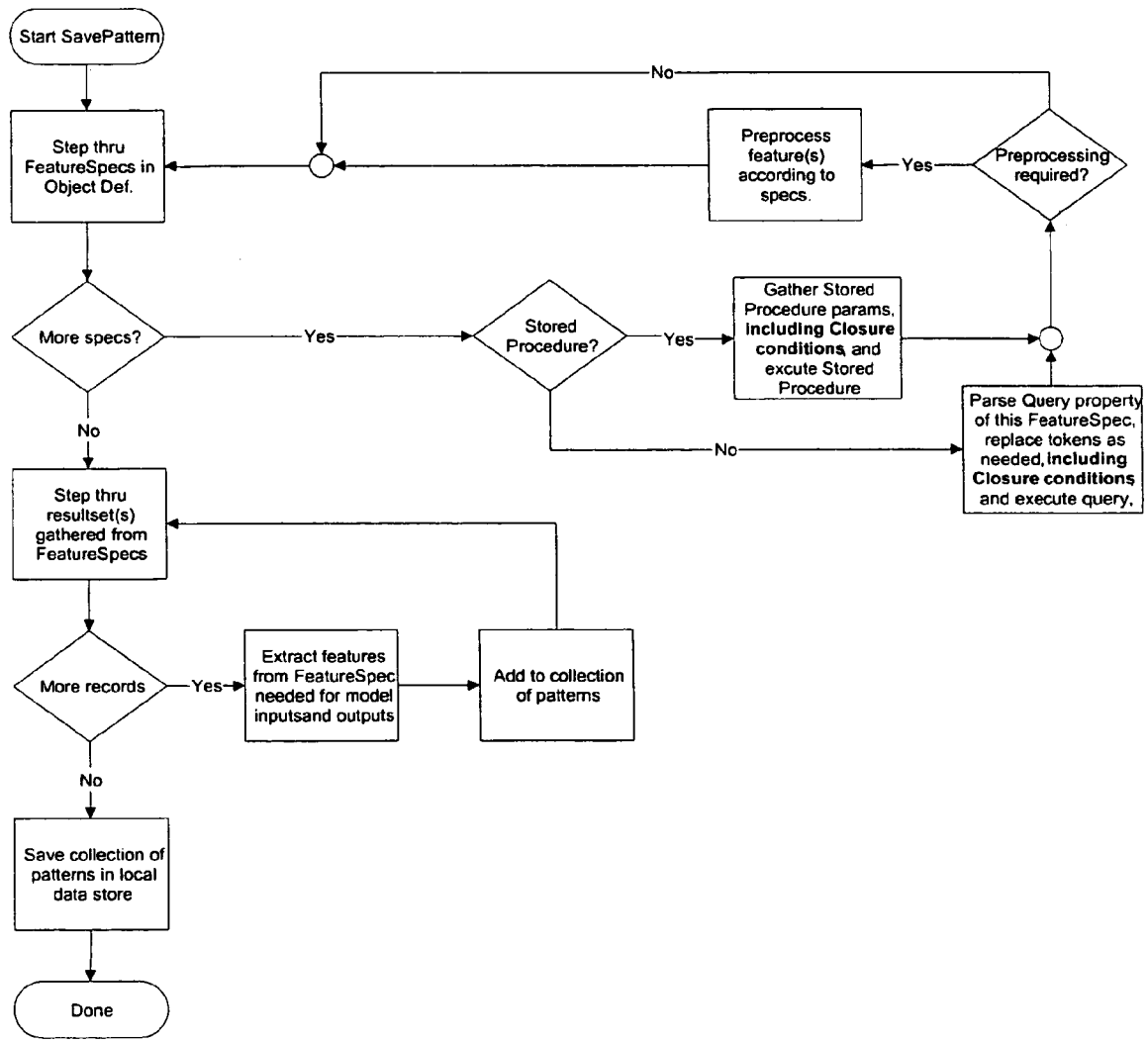
FIG. 34 shows a flow chart for a SavePattern module of the help desk modeling system of FIG. 30.
Figure 35:
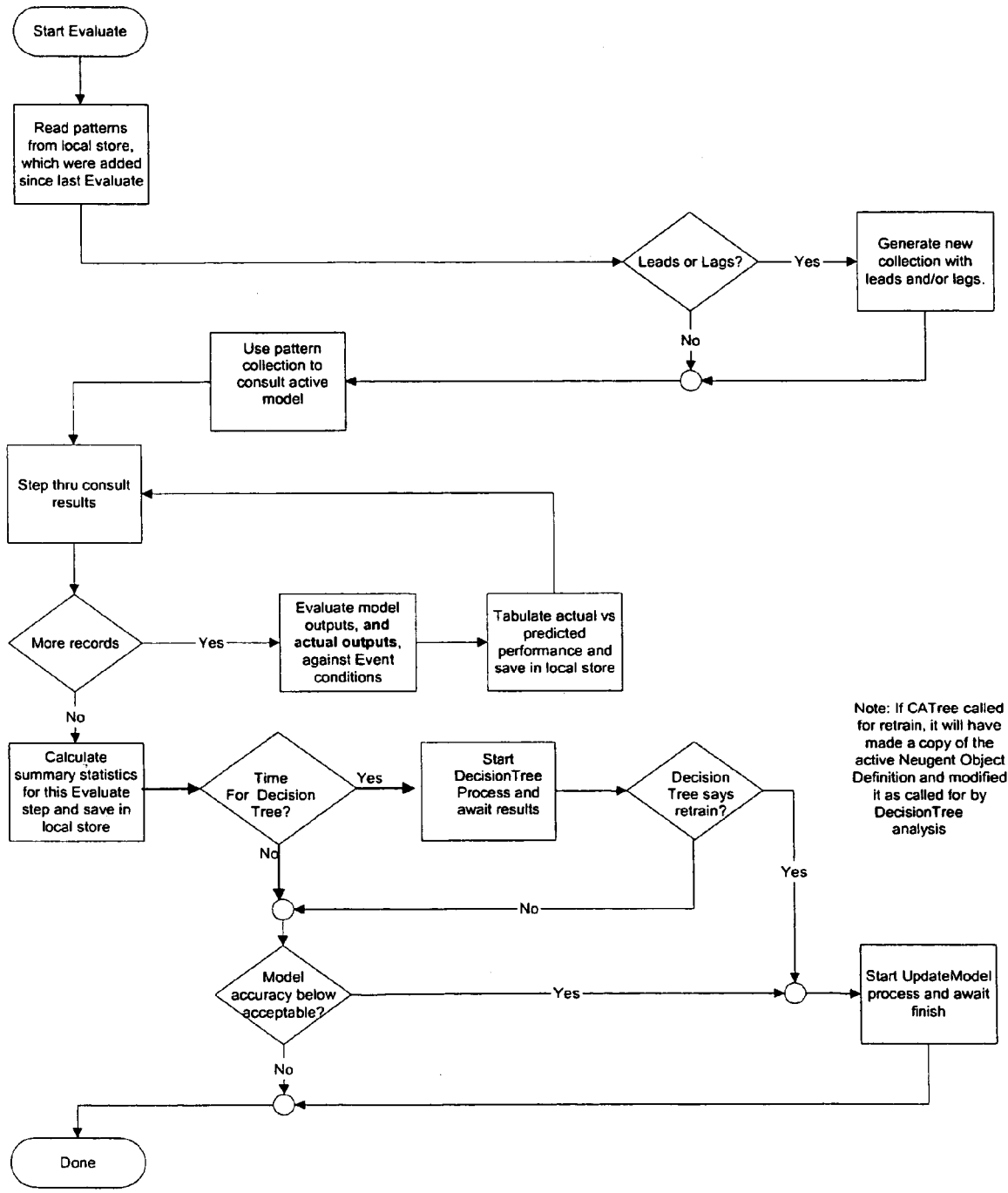
FIG. 35 shows a flow chart for an Evaluate module of the help desk modeling system of FIG. 30.
Figure 36:
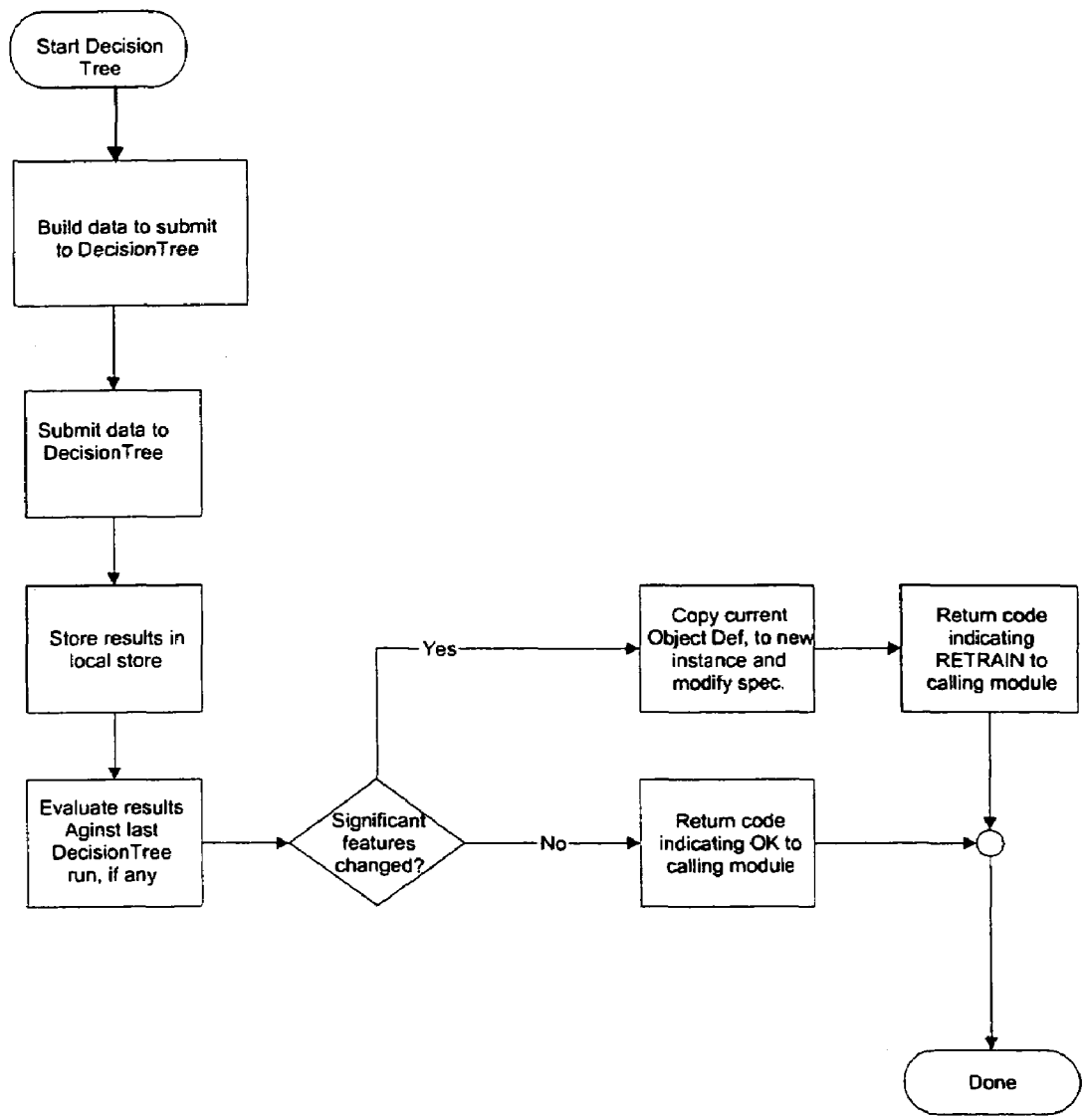
FIG. 36 shows a flow chart for a DecisionTree module of the help desk modeling system of FIG. 30.

An AHD tool, according to an embodiment of the methodologies of the present disclosure, is described below with reference to FIGS. 20-38. A block diagram of the AHD tool is shown in FIG. 30.

Neugents may be included in the AHD tool for monitoring and forecasting call levels to assist managers in forecasting system and queue loading, days and weeks ahead resource planning and balancing resources. Neugents also may be provided to monitor individual open calls, and, based on the historical behavior patterns, identify calls at risk of violating the SLA and alert managers and users to the calls. The individual Neugents are adapted to evaluate evolutionary changes in system behavior. Many of the behavior patterns are too complex for humans alone to identify violation trends. The AHD tool also helps managers and users to reassign or reprioritize such calls.

Installation

An installation wizard (FIG. 31) may be included to perform various setup operations which are only performed once or a few times. An installation wizard may install templates which allow users to choose an issue model with which the Neugent works. Users may map an issue to Requests (e.g., user problems or issues being tracked in the AHD system) alone, to Change Orders (related to corresponding Requests) alone, or to a combination of Requests and Change Orders. Using the installed templates users can customize the Neugent to monitor individual queues and sites within AHD.

Configuration Utility

A configuration utility may be provided to enable selection and/or management of various system parameters and definitions.

A configuration utility may provide multiple types and instances of Neugent configurations. For example, basic types of Neugents may include CallLevel Neugent and SLA-Violation Neugent. Typically, multiple instances of CallLevel Neugents are possible. Multiple instances of SLAViolation Neugents may exist as well. For example, wizard(s) may be provided to perform common tasks, such as deploying new Neugents instances (e.g., a Neugent dedicated to a particular queue). In addition, export mode configuration may be provided to define new styles and types of Neugents or to customize standard templates, such as the following: selection of Neugent instance intervals, etc.; feature set and related queries to include in pattern generation and modeling; association of AHD Events with a Neugent instance; train window (e.g., age of data to include in new models); and data aging (e.g., age at which to purge data). A standardized feature set, and related stored queries, may be included with installation of AHD. The configuration interface may provide advanced customization of queries and feature sets when desired.

Figure 24:
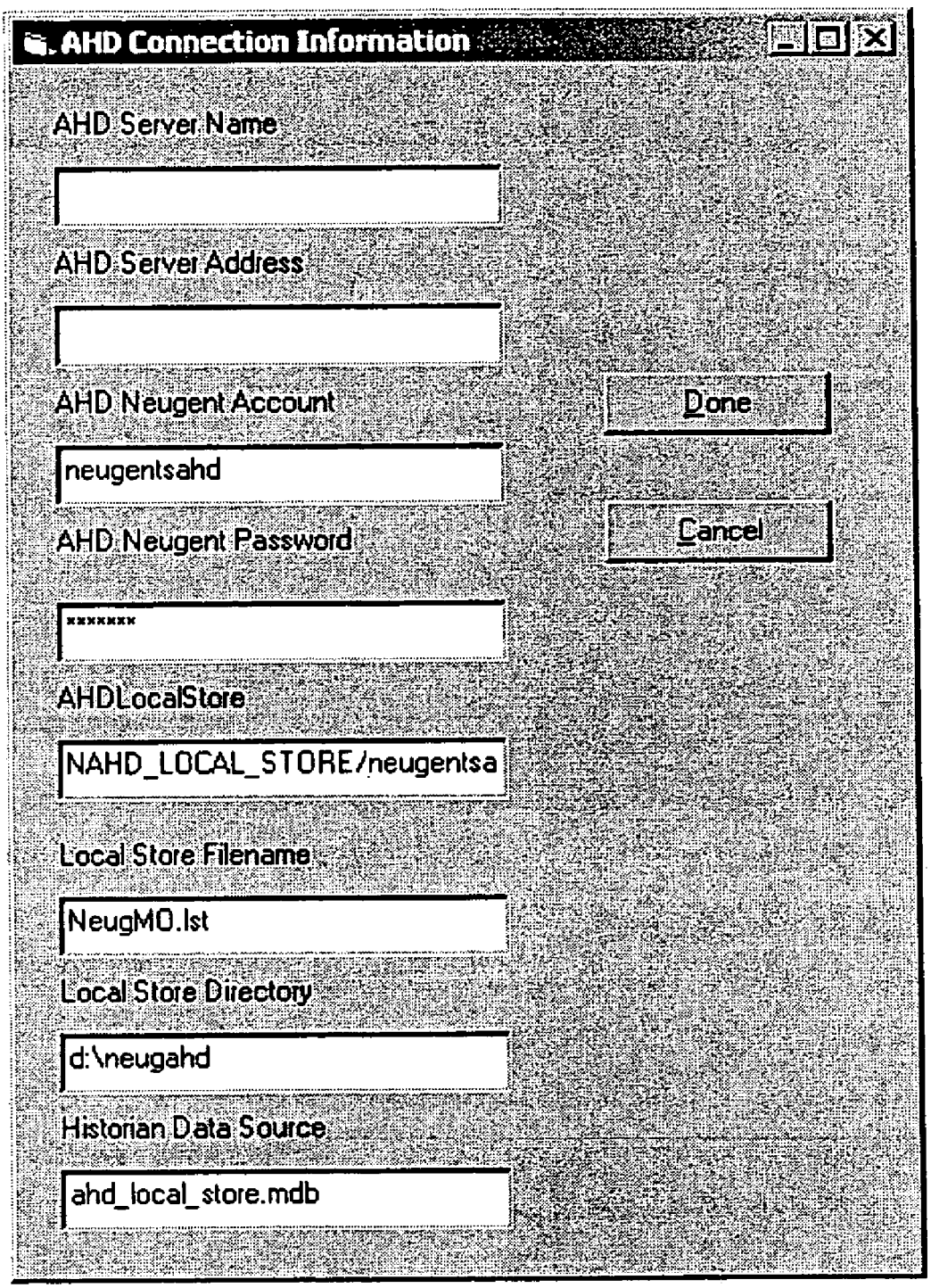
FIG. 24 show a user interface for entering database connection information in connection with the modeling system of FIGS. 14 and 19.

After selecting a Neugent instance to operate on, a tab-style interface similar to that in FIGS. 20-23 may be provided to allow entry and/or modification of the collections and properties associated with the Neugent instance. FIG. 24 shows a sample interface to enter database connection information for the AHD database. The configuration module may enable utilizing stored database procedures, in place of dynamic database (e.g., SQL) queries, if and when appropriate. The configuration module may provide tools to import/export stored queries from/to script files through the Tools menu. In addition a Test query button may be provided for viewing and/or executing the dynamic SQL query.

Manager Service

A manager service (FIG. 32) may be provided for the following functionality on a schedule determined by the properties of an object definition for each Neugent instance defined on the system. If the Manager Service does not find a Neugent model for an active Neugent instance, it switches to Historical Mode, in which available historical data is gathered, and a provisional model is trained and deployed.

Once there is an active Neugent model the manager service, at a specified interval (e.g., nightly), builds a collection of consult patterns from on-line data using the specifications defined in the Managed Object store. The collection is presented to the Neugent Provider for consult against the active model. If conditions warrant (e.g., predicted SLA violation) then the events specified in the object definition are raised through normal AHD channels, and reported through the AHD Historian.

Following consult, a process to build and store patterns for items which have closed is launched. The conditions for item closure are specified in the object definition.

At specified intervals (e.g., nightly), an Evaluation process is run to consult patterns which were withheld from the training process. Summary statistics on the results are saved and made available for viewing through the AHD Historian. During the Evaluation process, a DecisionTree process is run, according to specifications defined in the object definition, which may identify that the model should be retrained using different codes as inputs because the mix of significant category codes has changed. If the Evaluation process determines the existing model is inadequate, either due to insufficient accuracy or due to evolution of the system as detected by DecisionTree analysis, the manager service initiates retraining of the Neugent model.

Features are provided to efficiently schedule the sampling (and other) phases of each Neugent instance, to avoid overlapping resource intensive phases (e.g., Training) of multiple Neugents instances. Large rollup queries may be run in off-peak times (e.g., Lunchtime, nighttime).

For each Neugent instance the manager determines the appropriate methods to invoke for the current system conditions. Each of the methods below maps to the similar method for a given Neugent instance.

Upon a Neugent instance becoming active, the Manager Service switches to Historical Mode in order to gather any available historical data. Historical Mode uses query conditions specified in the Neugent instance definition to gather the data in a backward-looking fashion. Following collection of historical data, a Neugent model is trained and deployed, to enable immediate prediction capability when historical data is available.

Consult Method

When there is an active model for a Neugent instance, the manager service at the specified sample interval for a Neugent instance, builds a pattern(s) for the Neugent by using the feature set specifications defined for the instance. A Consult method (FIG. 33) uses the FeatureSpec definitions for the Neugent instance to generate one or more dynamic SQL queries. If preprocessing of the SQL results are specified, then such preprocessing is performed. Queries and subqueries which only generate output features for the model are not performed for consult.

As an alternative to using dynamic SQL queries, stored query procedures may be used. Parts of a query which are dynamic are parameters for the stored procedure.

The consult module interprets FeatureSpec and PreprocessingSpec tokens to perform tasks such as invoke an AHD function call to transform an SLA_expiration_time into an expected failure date, and then transform the date to an expiration_day_of_week and to expiration_time_of_day features. The specifications for preprocessing are contained in the object definition for the Neugent instance.

The consult result is compared against event triggers for the Neugent instance. For any triggered events, the appropriate-actions specified in the event definitions for the Neugent instance are taken. The actions taken in many instances are to raise AHD events, which generate alerts and notifications through normal AHD channels. Neugent calls the RaiseEvent utility when conditions warrant, and AHD determines when and how to alert users of a Neugent prediction.

Due to the nature of the dynamic SQL queries being built, the Consult module has a debug or expert mode enabled by, for example, a Windows Registry entry. The mode enables logging of some or all of the queries being generated and submitted to the database server.

SavePattern Method

Patterns are stored online through a Consult method (FIG. 34) to avoid having to do a costly or perhaps impossible reconstruction process offline. For example, if a feature value which is germane to an SLA Violation changes some time after the issue went into violation, it is difficult to recover that value without traversing database transaction logs. In addition, for rollup type features, it might be difficult to reconstruct a historical pattern.

The SavePattern module performs similar operations to the consult activity, except that the ClosureConditions in the object definition for the Neugent instance is evaluated and output features are gathered as well. The final results are combined to form a pattern which is stored in the local namespace framework. These patterns are later used for DecisionTree analysis and/or re-training. The pattern is likely a superpattern, in which the current model is not using all the available features. In that case additional features are being stored in the event it becomes desirable to use a different set of features in the model.

The replaceable tokens in the dynamic SQL queries (or stored procedures), in order to build patterns, include possible references to values in the local data store which allows, for example, an SLAViolation type Neugent to use the hourly sample of a CallLevel type Neugent for something like "calls opened in the last hour" as part of its pattern. A costly rollup query need not be repeated as frequently as the SLAViolation Neugent samples (e.g., 10 minutes) and instead the hourly average from a companion Neugent may be used.

The module creates a table in the local namespace framework, if one does not exist already.

An end of day function for the pattern build module is to purge pattern data beyond an aging limit specified in the system configuration. A time of day property in the object definition for the Neugent instance allows for synchronization with normal backup procedures.

Due to the nature of the dynamic SQL queries being built, the module has a debug or expert mode enabled by something such as a Windows Registry entry. The mode enables logging of some or all of the queries being generated and submitted to the database server.

Evaluate Method

An Evaluate method (FIG. 35) is called at intervals (e.g., Daily) specified in the Neugent instance definition. If a model is active for the Neugent instance and data is available, summary performance statistics are generated and stored for the instance. The data is available for use by the UpdateModel method, or for viewing and reporting with the AHD Historian. Performance evaluation does not rely on $R^2$ values as a figure of merit. Instead the figure of merit is tied to the Event conditions for the Neugent, i.e. whether an Event is raised when called.

DecisionTree Method

A DecisionTree module (FIG. 36) utilizes the DecisionTree parameters for the Neugent instance to perform discriminant analysis on available data. The primary candidates for re-evaluation in the AHD feature set are AHD category codes. The codes improve the effectiveness of a Neugent model. However, since the codes have no natural numerical ordering they are included in a Neugent model as binary features. Including non-significant features may adversely affect the Neugent model performance. Further, there may be too many features to include all in the model. Therefore, only the currently most significant ones may be included.

The category codes are extracted through significant preprocessing. By default, discriminant analysis is only enabled against the category codes. However, there are properties in the Neugent object definition structure to include other features in a DecisionTree analysis.

UpdateModel Method

Figure 37:
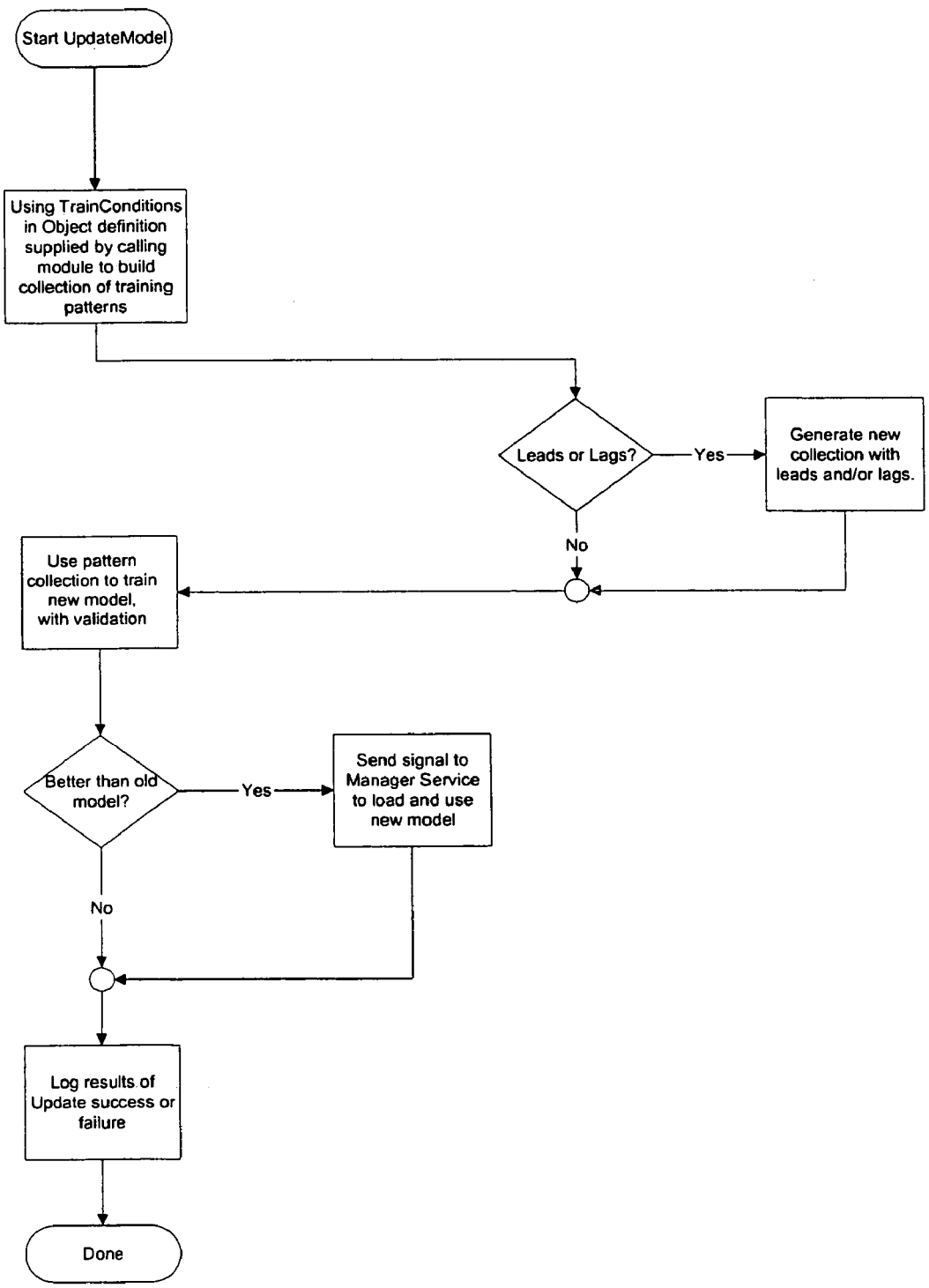
FIG. 37 shows a flow chart for an UpdateModel module of the help desk modeling system of FIG. 30.
Figure 38:
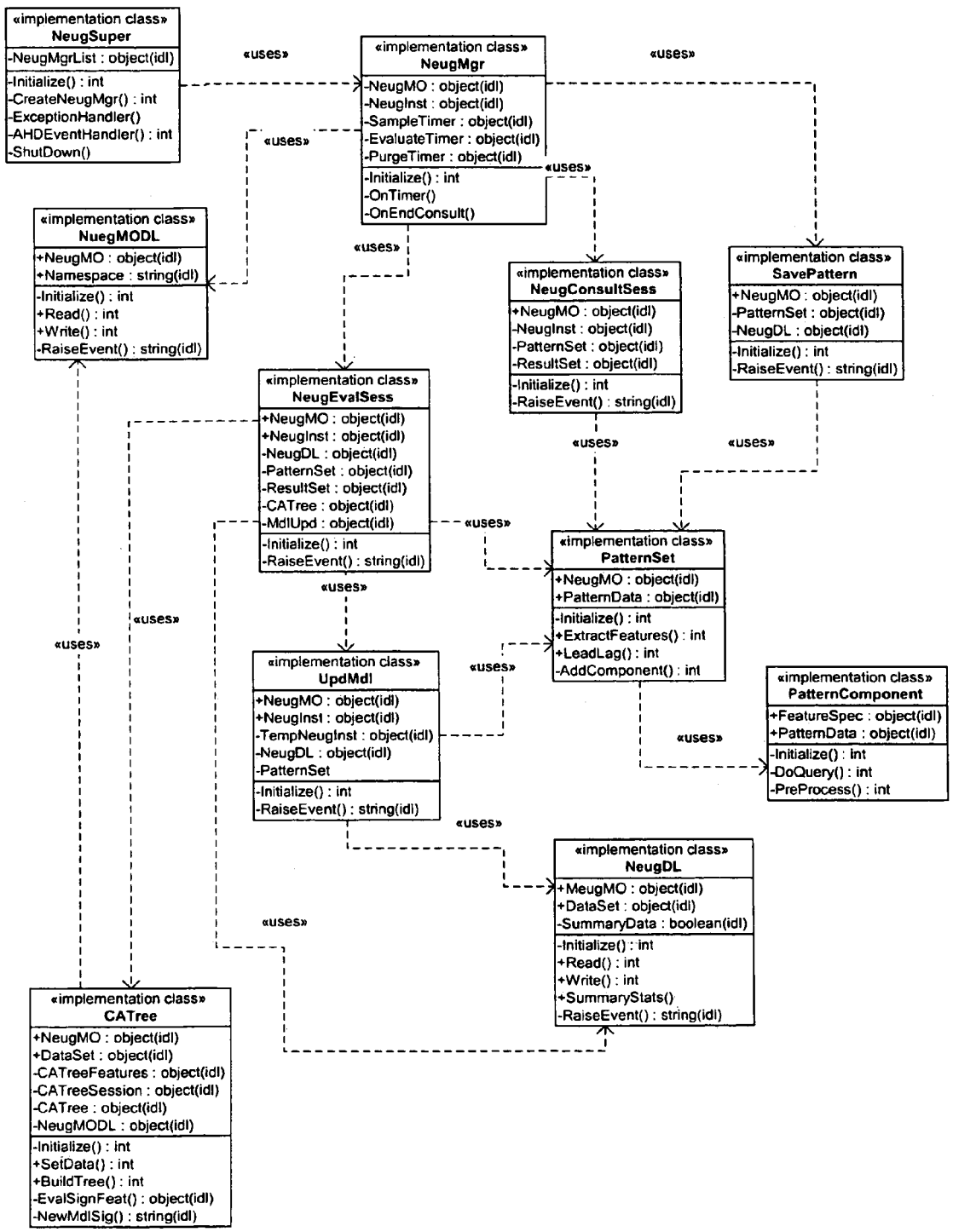
FIG. 38 shows a data flow diagram for the help desk modeling system of FIG. 30.

Under conditions specified for the UpdateModel instance (e.g., time of day) [FIG. 37], the manager service checks for availability of data for DecisionTree analysis and/or Neugent training. If no or insufficient data is available the model does nothing further.

If called by the Object definition for the Neugent instance, DecisionTree discriminant analysis is performed for available data. If the significant features have changed from what is in the current feature set, then the current Neugent instance object definition is backed up. Next, a flag is set to indicate a train set is to be preprocessed according to the new significant features, and re-training is initiated as discussed below.

If the Neugent instance calls for unconditional re-training at specified intervals, the method initiates training of a new model, with random validation, provided there is available data.

If the model meets minimum standards for accuracy, the manager attempts to install it as the current model. If there is no current model for the instance, the manager installs the model unconditionally. If there is an existing model, the manager compares the effectiveness of the new one to the currently active one. If the new one is more effective, it is marked as the active one. Otherwise, the old one stays active.

Historian Module

A Historian interface for user reporting (e.g., summary reporting of call-level prediction Neugents) may be provided. The Historian module provides an interface for users to view or print reports of Call Level Neugent predictions and/or prediction effectiveness. For example, users may select from the available Neugents instances and types, and then view available prediction and performance reports for the selected type. While reports may be graphical, some may be in a tabular format. A user may print the report through a standard Windows-style print dialog.

A user may view past performance of the Neugent (e.g., actual versus predicted). The statistical summaries may be stored by the Evaluation module of the Manager Service, and therefore may not need to be recalculated. A user also may print the report. Access restrictions to sensitive information may be provided through assignment of user account system security levels.

A Web Historian service may optionally be provided to provide viewing of reports through a web browser (e.g., Internet Explorer).

Similar to the configuration utility, the.Historian may have the same look-and-feel as other AHD interfaces. Statistical summaries and predictions may be stored by the Evaluation module of the Manager Service, and therefore may not need to be recalculated.

The Historian may display and print different reports for CallLevelNeugents and SLA Violation Neugents.

Figure 25:
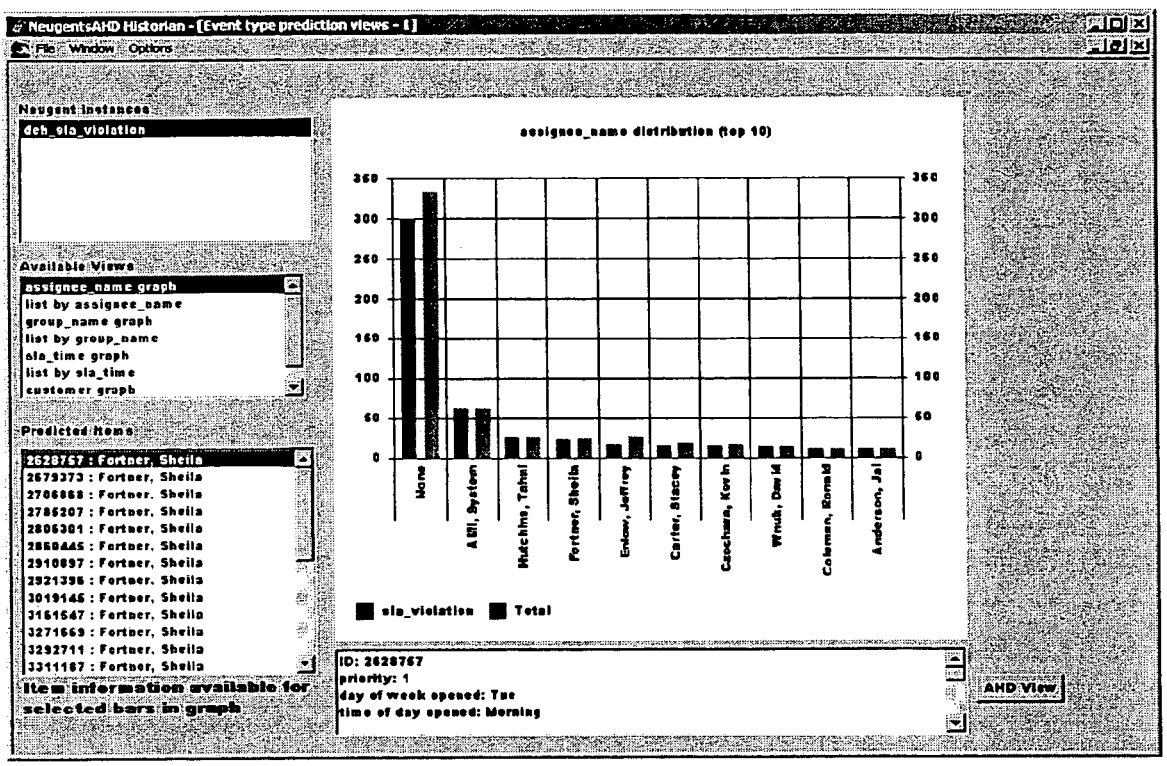
FIGS. 25-29 show exemplary user interfaces showing reports in connection with the help desk modeling example of FIGS. 14 and 19.
Figure 26:
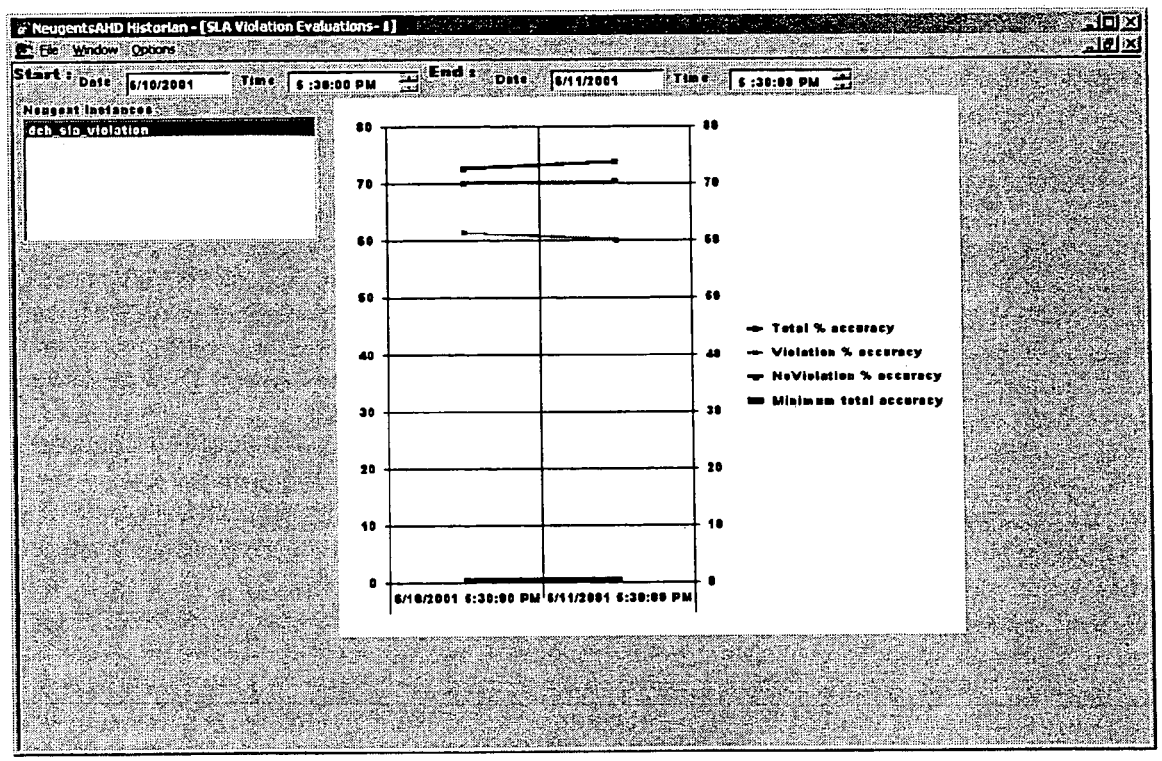
Figure 27:
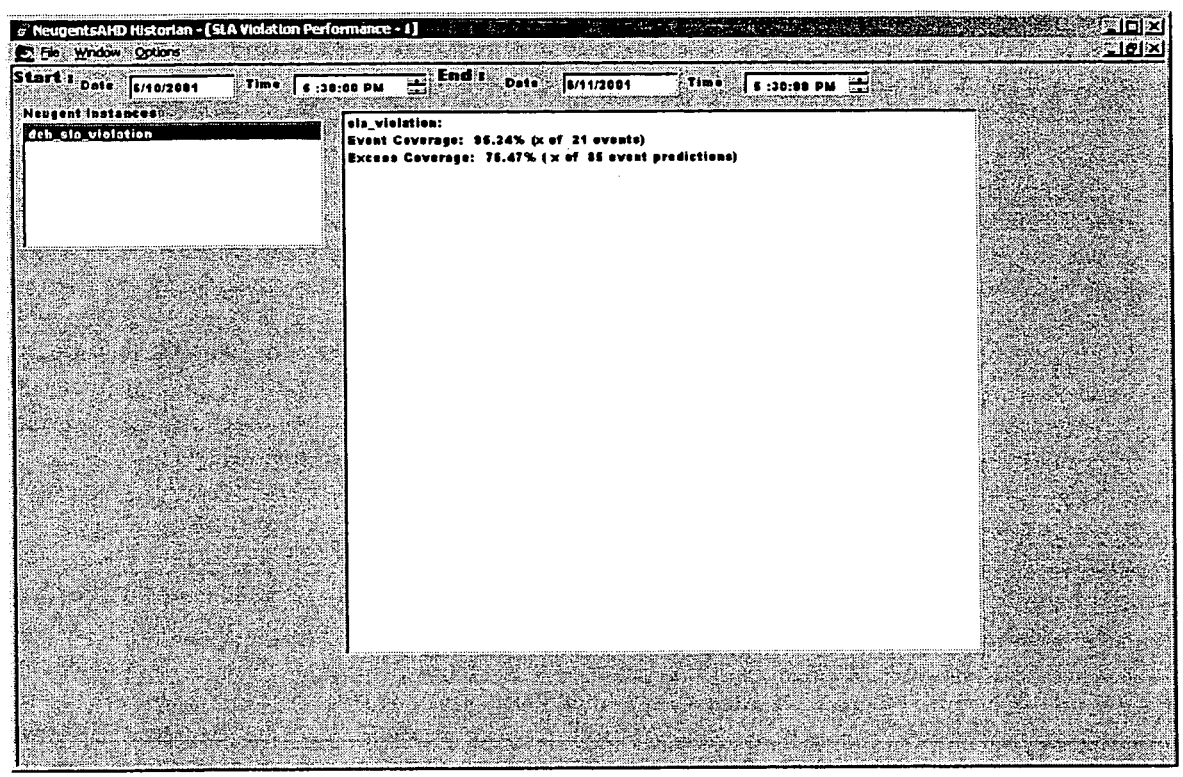

For SLA Violation Neugents, a number of reports may be available. Exemplary SLA Violation reports are illustrated in FIGS. 25-27. For example, a bar-chart graph of predictions for open issues (e.g., Calls, ChangeOrders, etc.) may be provided. Various views of the report may be available, which group the issues by assignee, queue, time-to-violation, and SLA type. Hotspots may be provided on the bar-chart, which when clicked brings up a listbox of the issues contained within a prediction bar. Clicking on an issue within the listbox brings up further details of the issue contained within AHD. For AHD installations equipped with an AHD WebServer, clicking on AHDView on the report brings up full details on the issue within the AHD web application.

Another report for SLAViolation Neugents may show the regular evaluations for the Neugent instance. The evaluations are performed by testing the active Neugent model on closed data, withheld from training.

In addition, another report for SLA violation Neugents may show the accuracy of past predictions, measured as calls which were predicted are closed over time. The performance measures may include Event Coverage (e.g., the percentage of actual SLA Violations which were correctly identified by AHD, and Excess Coverage (e.g., the percentage of non-violations which AHD tagged as likely violations).

Figure 28:
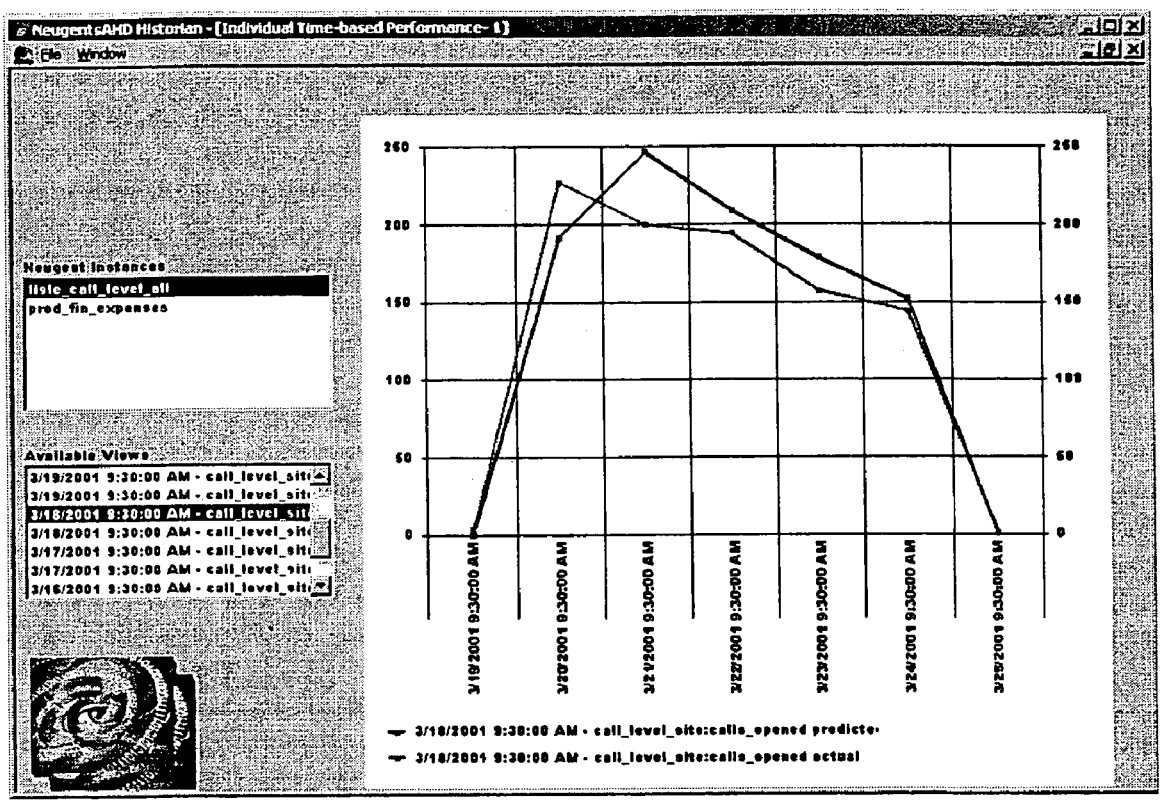

For CallLevel Neugents, various reports also may be available. Some exemplary CallLevel reports are illustrated in FIGS. 28 and 29. For example, one report may show the individual predictions made by a Callevel Neugent. Another report may be similar to the first, except multiple predictions may be superimposed on one graph. In addition, another report may show the actual versus predicted, called Individual Performance, levels for individual predictions. Another report may show average accuracy of all past predictions for a selected CallLevel Neugent.

Additional Utilities

The following functions may be available as function calls in one or more dynamic link libraries (DLLS) GetSecurityLevel is a utility which obtains the AHD Security Level of the logged-on user which may be used to restrict usage of the Historian and Configuration utilities. RaiseAHDEvent is a utility which passes alerts to the normal AHD Event handling channel when conditions warrant, such as when an SLA violation is predicted. The function may accept parameters (if needed) to qualify an event to be raised. An event is raised when the Neugent has determined that an SLA Violation has been predicted. Upon startup of the Neugent, the interface is initialized with AHD so that message flow is enabled.

Whenever the Neugent predicts that an SLA Violations is likely, a PredictSLA method is invoked to update the specified Request or Change Order. PredictSLA takes: a number of actions, including the following: (a) check the specified Request or Change Order; (b) increment the predict_sla_violated value in the request or Change Order record; (c) add an activity log with the specified contents of the Neugent message string.

Parallel/Distributed Processing

Multithreading may be used to enable parallel processing, when possible and appropriate. In addition, AHD may distribute Neugents between multiple consoles, in order to improve performance or to facilitate scaling. For example, the individual modules may be distributed among two or more processors, to improve system performance and scalability. For example, in a 24×7 operation there might be no real off-hour period which may be dedicated to model retraining. A list of server names and/or IP addresses may be maintained to facilitate interprocess communications.

Alternatively, the AHD service may run entirely on a dedicated Management Console, to minimize its impact on other subsystems at a customer site.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading the following applications, which are incorporated herein by reference:

(a) U.S. Ser. No. 60/374,064, filed Apr. 19, 2002 and entitled "PROCESSING MIXED NUMERIC AND/OR NON-NUMERIC DATA";

(b) U.S. Ser. No. 60/374,020, filed Apr. 19, 2002 and entitled "AUTOMATIC NEURAL-NET MODEL GENERATION AND MAINTENANCE";

(c) U.S. Ser. No. 60/374,024, filed Apr. 19, 2002, and entitled "VIEWING MULTI-DIMENSIONAL DATA THROUGH HIERARCHICAL VISUALIZATION";

(d) U.S. Ser. No. 60/374,041, filed Apr. 19, 2002 and entitled "METHOD AND APPARATUS FOR DISCOVERING EVOLUTIONARY CHANGES WITHIN A SYSTEM";

(e) U.S. Ser. No. 60/373,977, filed Apr. 19, 2002 and entitled "AUTOMATIC MODEL MAINTENANCE THROUGH LOCAL NETS";

(f) U.S. Ser. No. 60/373,780, filed Apr. 19, 2002 and entitled "USING NEURAL NETWORKS FOR DATA MINING"; and (g) PCT International Application No. PCT/US02/22977, filed Jul. 18, 2002 and entitled "METHOD AND APPARATUS FOR DISCOVERING EVOLUTIONARY CHANGES WITHIN A SYSTEM".

What is claimed is:

1. An adaptive system modeling method comprising:
   selecting from a plurality of candidate features of a system a set of input features and a superset of the input features and other features by using a baseline significance signature;
   using a computer system to generate a system model by using data corresponding to the selected input features set;
   maintaining online data corresponding to the superset of the input features and other features collected from the system;
   determining a new significance signature of the system by using the online superset data to perform a discriminant analysis of the candidate features; and
   detecting an evolutionary change in the system by comparing the new significance signature and the baseline significance signature.

2. The method of claim 1 further comprising selecting new input features by using the new significance signature.

3. An adaptive system modeling method comprising:
   determining a baseline significance signature of current behavior of a system by performing a discriminant analysis;
   selecting from a plurality of candidate features a set of input features and a superset of the input features and other features by using the baseline significance signature;
   using a computer system to generate a system model by using data corresponding to the selected input features set; and
   maintaining online data corresponding to the superset of the input features and other features collected from the system.

4. The method of claim 3 further comprising:
   evaluating an accuracy of predictions by the system model based on additional input features data;
   determining a new significance signature of the system by performing another discriminant analysis of the candidate features, if the accuracy of the system model predictions is below a predetermined accuracy level; and
   selecting new input features by using the new significance signature.

5. The method of claim 4, wherein the additional input features data is obtained from the online collection of data.

6. An adaptive system modeling method comprising:
   determining a baseline significance signature of current behavior of a system by using a decision tree methodology to perform a discriminant analysis;
   selecting from a plurality of candidate features of the system a set of input features by using the baseline significance signature; and
   using a computer system to generate a system model by using data corresponding to the selected input features set.

7. A program storage device readable by a machine, tangibly embodying a program of instructions executable by the machine, the program instructions when executed by the machine operable to:
   select from a plurality of candidate features of a system a set of input features and a superset of the input features and other features by using a baseline significance signature;
   generate a system model by using data corresponding to the selected input features set;
   maintain online data corresponding to the superset of the input features and other features collected from the system;
   determine a new significance signature of the system by using the online superset data to perform a discriminant analysis of the candidate features; and
   detect an evolutionary change in the system by comparing the new significance signature and the baseline significance signature.

8. A program storage device readable by a machine, tangibly embodying a program of instructions executable by the machine, the program of instructions when executed by the machine operable to:
   determine a baseline significance signature of current behavior of a system by performing a discriminant analysis;
   select from a plurality of candidate features a set of input features and a superset of the input features and other features by using the baseline significance signature;
   generate a system model by using data corresponding to the selected input features set; and
   maintain online data corresponding to the superset of the input features and other features collected from the system.

9. A program storage device readable by a machine, tangibly embodying a program of instructions executable by the machine, the program of instructions when executed by the machine operable to:
   determine a baseline significance signature of current behavior of a system by using a decision tree methodology to perform a discriminant analysis;
   select from a plurality of candidate features of the system a set of input features by using the baseline significance signature; and
   generate a system model by using data corresponding to the selected input features set.

10. A computer system, comprising:
    a program storage device readable by the computer system, tangibly embodying a program of instructions; and
    a processor operable to execute the program of instructions to:
      select from a plurality of candidate features of a system a set of input features and a superset of the input features and other features by using a baseline significance signature;
      generate a system model by using data corresponding to the selected input features set;

maintain online data corresponding to the superset of the input features and other features collected from the system;

determine a new significance signature of the system by using the online superset data to perform a discriminant analysis of the candidate features; and detect an evolutionary change in the system by comparing the new significance signature and the baseline significance signature.

11. A computer system, comprising:

a program storage device readable by the computer system, tangibly embodying a program of instructions; and a processor operable to execute the program of instructions to:

determine a baseline significance signature of current behavior of a system by performing a discriminant analysis;

select from a plurality of candidate features a set of input features and a superset of the input features and other features by using the baseline significance signature;

generate a system model by using data corresponding to the selected input features set; and maintain online data corresponding to the superset of the input features and other features collected from the system.

12. A computer system, comprising:

a program storage device readable by the computer system, tangibly embodying a program of instructions; and a processor operable to execute the program of instructions to:

determine a baseline significance signature of current behavior of a system by using a decision tree methodology to perform a discriminant analysis;

select from a plurality of candidate features of the system a set of input features by using the baseline significance signature; and generate a system model by using data corresponding to the selected input features set.

* * * * *